US012623436B2

(12) United States Patent
Seth et al.

(10) Patent No.: US 12,623,436 B2
(45) Date of Patent: May 12, 2026

(54) BARRIER COMPOSITE WITH AN INTEGRAL RELEASE LAYER AND METHOD OF MAKING SAME

(71) Applicant: Arista Construction Systems FZE, Dubai (AE)

(72) Inventors: Manish Seth, Burnaby (CA); Gregory K. Jones, Mechanicsville, VA (US)

(73) Assignee: Arista Construction Systems FZE, Dubai (AE)

( * ) Notice: Subject to any disclaimer, the term of this patent is extended or adjusted under 35 U.S.C. 154(b) by 121 days.

(21) Appl. No.: 18/719,635

(22) PCT Filed: Dec. 15, 2022

(86) PCT No.: PCT/IB2022/062319

§ 371 (c)(1),
(2) Date: Jun. 13, 2024

(87) PCT Pub. No.: WO2023/111950

PCT Pub. Date: Jun. 22, 2023

(65) Prior Publication Data

US 2025/0050620 A1      Feb. 13, 2025

Related U.S. Application Data

(60) Provisional application No. 63/290,015, filed on Dec. 15, 2021.

(51) Int. Cl.
B32B 7/06          (2019.01)
B32B 3/30          (2006.01)
(Continued)

(52) U.S. Cl.
CPC .................. B32B 7/06 (2013.01); B32B 3/30 (2013.01); B32B 5/022 (2013.01); B32B 5/024 (2013.01);
(Continued)

(58) Field of Classification Search
CPC .......... B32B 2419/00; B32B 2307/748; B32B 2307/7265; B32B 2307/7375;
(Continued)

(56) References Cited

U.S. PATENT DOCUMENTS

2004/0180195 A1      9/2004   Macuga
2010/0223872 A1*     9/2010   Taylor ............... E04F 15/02188
                                                                52/309.3
(Continued)

OTHER PUBLICATIONS

International Search Report for PCT/IB2022/062319, mailed Mar. 22, 2023.
(Continued)

*Primary Examiner* — Vishal I Patel
(74) *Attorney, Agent, or Firm* — Devlin Law Firm LLC

(57)          ABSTRACT

A barrier composite has a barrier layer that is water resistant, and adhesive for applying the barrier composite to an external wall surface and an integral release layer to allow the adhesive to release such that a roll or barrier composite can be unspooled and attached directly the said wall surface without removing a release liner. A barrier composite may also include a plurality of stand-offs extending to an exterior surface of the barrier composite and configured to allow precipitation that has passed through the outer shingles to flow down along the barrier composite. The integral release layer may be configured on, in or over the stand-offs. The stand-offs may be configured with a material that prevents the adhesive from adhering or that splits or fractures to produce stand-off deposits. Alternatively, the adhesive may be configured to wick into the stand-offs and then split producing adhesive deposits on the stand-offs.

20 Claims, 17 Drawing Sheets

(51) Int. Cl.

| | |
|---|---|
| *B32B 5/02* | (2006.01) |
| *B32B 5/18* | (2006.01) |
| *B32B 7/12* | (2006.01) |
| *B32B 27/06* | (2006.01) |
| *B32B 27/12* | (2006.01) |
| *B32B 27/28* | (2006.01) |
| *B32B 27/40* | (2006.01) |
| *E04B 1/66* | (2006.01) |

(52) U.S. Cl.
CPC ................ *B32B 5/18* (2013.01); *B32B 7/12* (2013.01); *B32B 27/065* (2013.01); *B32B 27/12* (2013.01); *B32B 27/283* (2013.01); *B32B 27/40* (2013.01); *E04B 1/665* (2013.01); *B32B 2307/7265* (2013.01); *B32B 2307/7375* (2023.05); *B32B 2307/748* (2013.01); *B32B 2419/00* (2013.01)

(58) Field of Classification Search
CPC ....... B32B 27/40; B32B 27/283; B32B 27/12; B32B 27/065; B32B 7/12; B32B 5/18; B32B 5/024; B32B 5/022; B32B 3/30; B32B 7/06; E04B 1/665
See application file for complete search history.

(56) References Cited

U.S. PATENT DOCUMENTS

| | | | |
|---|---|---|---|
| 2011/0209424 A1 | 9/2011 | Longo | |
| 2018/0245332 A1* | 8/2018 | Widenbrant | ............ B32B 5/026 |

OTHER PUBLICATIONS

Written Opinion of the International Searching Authority for PCT/IB2022/062319, mailed Mar. 22, 2023.
Written Opinion of the International Preliminary Examining Authority for PCT/IB2022/062319, mailed Nov. 13, 2023.
International Preliminary Report on Patentabiliyt for PCT/IB2022/062319, issued Feb. 16, 2024.

* cited by examiner

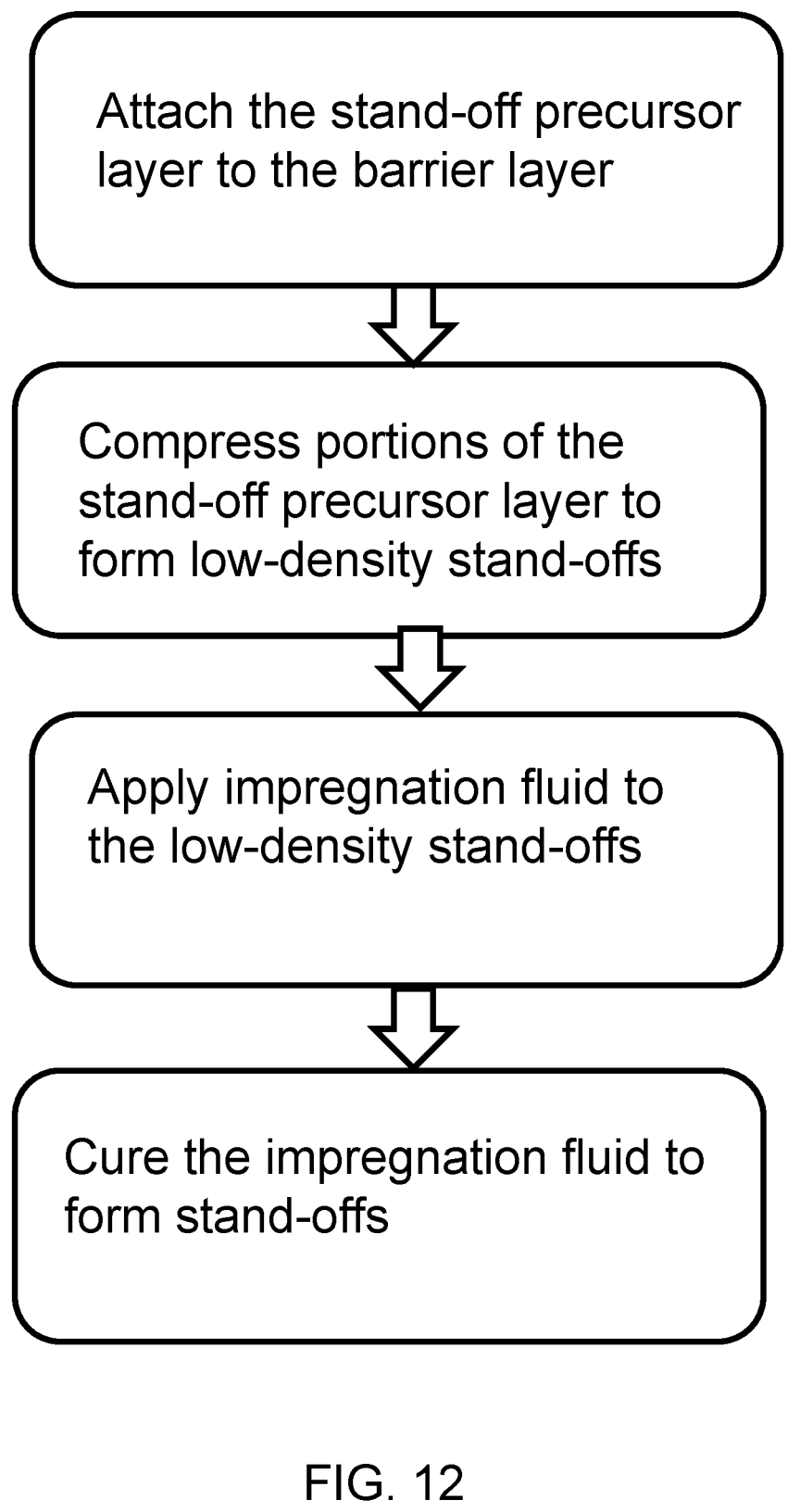

Attach the stand-off precursor
layer to the barrier layer

Compress portions of the
stand-off precursor layer to
form low-density stand-offs Apply impregnation fluid to
the low-density stand-offs Cure the impregnation fluid to
form stand-offs

FIG. 12

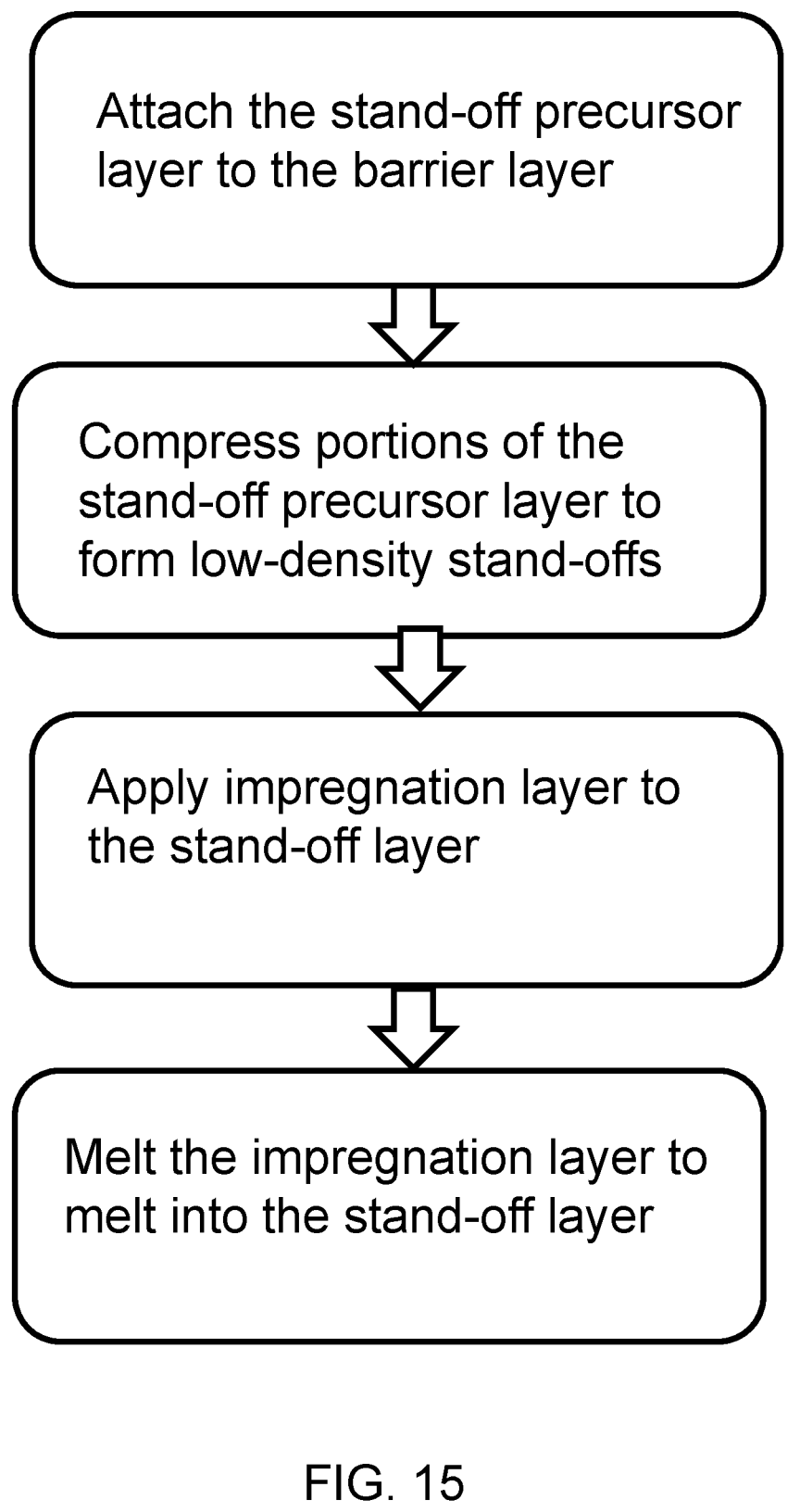

Attach the stand-off precursor layer to the barrier layer

Compress portions of the stand-off precursor layer to form low-density stand-offs Apply impregnation layer to the stand-off layer Melt the impregnation layer to melt into the stand-off layer

FIG. 15

BARRIER COMPOSITE WITH AN INTEGRAL RELEASE LAYER AND METHOD OF MAKING SAME

CROSS REFERENCE TO RELATED APPLICATIONS

This application claims the benefit of priority to U.S. provisional application No. 63/290,015, filed on Dec. 15, 2021; the entirety of which is hereby incorporated by reference herein.

BACKGROUND OF THE INVENTION

Field of the Invention

The invention relates to barrier composites with an integral release layer to allow an adhesive layer in a roll of barrier composite to release from an adjacent layer such that the roll can be unspooled and then be adhered to an exterior of a building to provide a barrier from precipitation and in some cases the integral release layer is configured on stand-offs that are configured to allow drainage of precipitation to drain down along the barrier layer and away from the building.

Background

Housewrap is used to prevent precipitation from contacting the exterior wall board or surface of a building or home. The housewrap has a barrier layer that is water resistance to prevent water from passing therethrough. Housewrap also insulates the building by preventing bulk flow of air through the seams in the exterior wall board. A housewrap material is placed between the exterior wall board, such as plywood, and the outer shingles or siding of the home. Housewrap may include an adhesive that enables a sheet of the housewrap to be adhered directly to the exterior wall board. The adhesive is covered with a detachable release film and removing this release film is difficult and causes handling issues and waste. Also, when peeling off the detachable release film, the housewrap can stick to itself thereby causing the sheet to be scrapped.

In addition, precipitation that passes through the shingles may get trapped between the shingles and the housewrap when there is no gap to allow this penetrated water to drain. Therefore, efforts have been made to produce housewrap with spacers or stand-offs incorporated therein. These stand-offs however are typically low density, and can become compressed when the shingles are applied over the housewrap, thereby preventing proper drainage of water. Also, some stand-offs are discrete stand-offs that are applied or adhered discretely to the housewrap which can lead to detachment, or the discrete stand-offs being dislodged.

SUMMARY OF THE INVENTION

The invention is directed to barrier composites with an integral release layer to allow an adhesive layer in a roll of barrier composite to release from an adjacent layer such that the roll can be unspooled and then be adhered to an exterior of a building to provide a barrier from precipitation. An integral release layer or material is configured to allow the adhesive of an adjacent layer to easily release and maintain adhesion properties for adhesion to a wall board. An integral release layer may be a film or fabric that is configured to fracture or split and stick to the adhesive when the roll of barrier composite is unspooled. In some cases, the integral release layer is configured on stand-offs that are configured to allow drainage of precipitation to drain down along the barrier layer and away from the building.

The barrier composite is configured with an adhesive on an interior surface of the barrier composite, or on an opposite side of the barrier layer from the integral release layer and/or the stand-offs, which are configured on an exterior surface. The integral release layer is configured to eliminate the need for a separate detachable release layer that is configured between the adhesive and adjacent layers in a roll of barrier layer composite. An integral release layer may be configured with a material that prevents the adhesive from adhering or that splits or fractures to produce deposits. Alternatively, the adhesive may be configured to wick into the stand-offs and then split producing adhesive deposits on the stand-offs.

An integral release layer may be configured in a pattern wherein only a portion of the barrier layer is covered with the integral release layer or material. In some cases, a continuous integral release layer is processed such that only a portion of the integral release layer is configured to enable the adhesive to release. For example, an integral release layer may include a bonded portion and non-bonded portions, wherein the non-bonded portions are configured to fracture and stick to the adhesive to enable release of the adhesive from an adjacent layer. The non-bonded portions of the integral release layer may be configured in discrete areas and the percent coverage may be such that the adhesive is easily unspooled yet retains effective adhesion to a wall board.

In an exemplary embodiment, the barrier composite includes stand-offs to promote drainage of water between the wall board and shingles or siding, for example. The integral release material or integral release layer may be coupled to the stand-offs. For example, the non-bonded integral release layer may be configured over the stand-offs and this integral release layer may be configured to prevent the adhesive from bonding to the stand-offs and may be configured to split or fracture upon separation of layers of the barrier composite. Having the integral release layer configured over the stand-offs may be preferred as the stand-offs extend out from the barrier layer and will be first to contact the adhesive layer when the barrier composite is spooled. The stand-offs may form a natural stand-off for preventing the adhesive from contacting the area around the stand-offs. This reduced area of contact in combination with an integral release layer may be well suited for enabling the adhesive layer to release.

The invention also includes methods to produce said the barrier composite, which includes attaching the integral release material or integral release layer to the barrier layer, or to or over the stand-offs. As described herein, an integral release layer may be a film of material, such as a polymer film and this film may be attached in areas to the barrier layer leaving non-bonded areas that are configured to fracture and stick to the adhesive layer. The film may be adhered to the barrier layer using a patterned calendaring roll. Also, the stand-offs and/or the integral release layer may be formed using a patterned calendaring roll. In an exemplary embodiment, the stand-offs and the integral release layer are formed simultaneously by processing through a patterned calendaring roll. The stand-offs may include a foam or fabric that can be compressed using a patterned calendaring roll and heat may be applied to fix the compressed portion by melting the compressed portions. This heat may be used to melt laminate the stand-off layer to the barrier layer. All three layers, the barrier layer, stand-off layer and integral release layer maybe attached together as the stand-offs are formed through compression by a patterned calendaring roll. The barrier composite may be calendared to produce compressed portions of the stand-off layer and raised portions forming the stand-off, or the stand-offs.

An integral release material or layer may include an impregnation liquid that may then be applied to the stand-off precursor and wick or absorb into the non-compressed portions to increase the density of the stand-offs. Likewise, an impregnation layer, such as a film of polymer may be applied over the stand-off precursor and subsequently melted to again wick or absorb into the stand-off precursors.

Also, an integral release layer may be applied over the stand-off layer and bonded to the stand-off layer around the stand-offs to prevent the adhesive from attaching to the stand-offs and enabling the non-bonded or loose integral release layer configured over the stand-offs to easily fracture and stick to the adhesive. The integral release layer may be a film of material that may be configured to split or facture when adjacent layers of the barrier composite are separated, such as from being unspooled from a roll. The integral release layer may also aid in producing a barrier composite that is water resistant or water proof. The integral release layer may be configured in the compressed portions of the stand-off layer, or around the raised stand-offs, which is the area where precipitation will flow down. Configuring a film of material in these regions may improve durability and water resistance of the barrier composite.

A barrier composite may be configured with stand-offs on the exterior surface and these stand-offs are configured to provide a space for drainage of water along the barrier composite. The stand-offs may be discrete stand-offs, wherein they do not extend more than about 0.5 m in length and may be any suitable shape, such as circular or elongated stand-offs, wherein the length is at least twice the width. The stand-offs may have a height, extension dimension away from the barrier layer, that is effective to enable water to flow between the stand-offs and the shingles of the building, such as about 0.2 mm or more, about 0.5 mm or more, about 1 mm or more, about 2 mm or more, about 3 mm or more, about 5 mm or more, about 7 mm or more and any range between and including the stand-off heights provided. The width and/or length of a stand-off may be about 4 mm or more, about 6 mm or more, about 8 mm or more, about 10 mm or more, about 15 mm or more, 20 mm or more, about 25 mm or more and any range between and including the dimensions provided. The discrete stand-offs may have an area coverage, or specific coverage area, on the exterior surface of about 25% or more, about 35% or more, about 50% or more, about 65% or more, about 75% or more and any range between and including the specific coverage areas provided. The stand-offs may be circular in shape, polygonal, rectangular, elongated having a length that is at least twice a width, and may include a combination of geometries to provide effective drainage.

A stand-off may be a polymeric material that is applied to the barrier layer or may be a layer that is further processed to form the stand-offs. A stand-off precursor may be a stand-off fabric, or layer of material, such as a woven fabric, non-woven fabric, or foam, that is compressed in areas to produce non-compressed portions that form the stand-offs. The stand-off precursor may have pores or porosity that enables compression of regions around the stand-offs. Also, heat may be applied to melt the compressed portions of the stand-off fabric to produce melted compressed portions that prevents re-expansion of the compressed portions. Melting of the compressed regions may produce a thin compressed region between the non-compressed portions that will not re-expand. Also, compression and melting of the compressed portions may reduce any porosity and pores in the compressed portions and thereby prevent impregnation liquid or film from wicking into the compressed portions. A compressed portion or melted compressed portion may have a thickness that is a half or less the thickness of an adjacent stand-off, or a quarter or less, or a sixth or less, or an eighth or less, or even a tenth or less and any range between and including the thickness ratios provided. A higher ratio means that the stand-off is more pronounced from the compressed and/or melted compressed portions.

An impregnation liquid may be applied to the stand-off precursor layer and wick or absorb into the stand-off precursor, to produce higher density stand-offs than the stand-off precursor material. The impregnation liquid may include an impregnation solid material, such as a polymer and/or wax that is melted to form a liquid, or is configured in a solution or mixture with a carrier fluid that can be deposited into the pores of the stand-off precursor. The carrier fluid may wick into the pores of the stand-off precursor and carry the wax or polymer therein. Likewise, an impregnation layer, such as a film of material, may be applied to the precursor stand-off layer and subsequently melted to wick and absorb into the non-compressed portions of the stand-off precursor. The melting temperature of the stand-off precursor may be higher than that of the impregnation layer, such as about 5° C. or more, about 10° C. or more, about 15° C. or more about 20° C. or more and any range between and including the temperatures provided. A greater differential in melting temperature will enable a more controllable process. The impregnation layer may be applied over the stand-off precursor prior to the stand-off precursor being compressed to form the stand-offs.

An impregnation liquid may be applied by a spray or by a roll-to-roll process, or through a dip process, wherein the stand-off precursor is contacted with or submerged in the impregnation liquid. The stand-off precursor with the impregnation liquid may be heated to evaporate the liquid portion of the impregnation liquid and leave the solids within the pores of the stand-off.

The barrier composite may have a moisture vapor transmission rate (MVTR) that meets industrial standards for housewrap material, or roofing underlayment material such as greater than about 5 US perm to meet code, about 10 US perm or more, about 20 US perm or more, about 50 US perm or more, and may be as much as 100 US perm, or any range between and including the MVTR values provided. For roofing underlayment, the MVTR may be from about 0.1 US perm to 100 US perm.

The barrier layer is a barrier for liquids, such as water from precipitation, passing therethrough and also blocks or reduces bulk flow of air, such as from wind. A barrier layer may be water resistant and prevent bulk flow of water therethrough, wherein no liquid water will flow through the barrier composite for 5 minutes with a 25 mm water column. Preferably the barrier composite is waterproof, wherein it can withstand a pressure of over 1,000 millimetres of water (9.8 kPa) pressure without leaking, as described in ASTM D3393-Standard Specification for Coated Fabrics Waterproofness. A retention of a minimum hydrohead of 55 cm water for 5 hours is specified by Acceptance Criteria, (AC) 38, according to test method AATCC127 for housewrap. The barrier layer may also block or reduce the bulk flow of air therethrough, wherein the permeability is defined as having a Gurley time of more than about 100 seconds or more, about 500 seconds or more, about 1,000 seconds or more, about 2500 seconds or more and any range between and including the times provided, as measured by a Gurley Densometer 4340, Gurley Precision Instruments (Troy NY). Housewrap standard for air barrier: ASTM E2178, 0.004 cfm/sq ft @delta P=75 Pa.

A barrier layer may include one or more layers of a woven or non-woven material, such as a melt-blown or spunbonded polymeric non-woven. A barrier layer may include a microporous film or layer that has pores that are less than 10 micro-meters in size. A microporous film may be formed via extrusion and in some cases subsequent stretching to form the microporous structure. A composite barrier layer may include a microporous layer, such as an extruded film layer that is subsequently stretched and a woven or non-woven for additional strength. A barrier layer may be or include a film layer that has no bulk flow of air therethrough but has effective MVTR, such as a urethane film, or silicone film. A film layer may be laminated to or attached to one or more layers of a woven or non-woven or foam material.

An adhesive may be configured on the interior surface of the barrier composite. The adhesive may be a pressure sensitive adhesive that enables the barrier composite to be adhered directly the exterior wall surface of a building. The adhesive may a continuous layer or discrete adhesive portions applied to the interior surface. A pressure sensitive adhesive is a type of nonreactive adhesive which forms a bond when pressure is applied. Pressure sensitive adhesives are typically effective above a lower threshold temperature and in some cases below an upper threshold. When the temperature is too low, pressure sensitive adhesives can lose their tack and when the temperature is too high they can have reduced shear holding ability. A pressure sensitive adhesive may be a co-polymer, such as a styrene block copolymer (SBC).

The barrier composite may be configured with an integral release or integral release layer to eliminate the need for a separate release layer. The stand-offs may be configured to split or fracture to enable layers to be separated while maintaining plenty of adhesive surface area for effective adhesion of the barrier composite to a building. The stand-offs may be non-woven material that may have multiple layers, wherein a portion or layer is configured to split or fracture to enable the adhesive to separate from the stand-off layer. Also, an impregnation material may be a low surface energy material that prevents adhesion, wherein the surface energy of the impregnation liquid is about 30 dynes/cm or less, or about 25 dynes/cm or less, about 20 dynes/cm or less.

An integral release layer may be configured over the stand-offs and may be configured to split or fracture when an adjacent layer of barrier composite is peeled away or separated. The adhesive layer of the adjacent barrier composite may stick to the integral release layer and the release layer may break or facture in discrete areas to allow release of the adhesive layer. The integral release layer may be a film of material that is adhered to the stand-off layer and may be adhered in around the stand-offs, such as in compressed portions around the stand-offs. An integral release layer may be a film of material or polymer that has no bulk flow of air therethrough, thereby having a Gurley time of more than 100 seconds (4340 Gurley Densometer test). This film of polymer may be very thin, such as no more than about 50 μm, no more than about 30 μm, no more than about 25 μm, no more than about 20 μm, no more than about 15 μm, no more than about 10 μm, no more than about 5 μm, and any range between and including the values provided. A thinner integral release layer may be less expensive and may more readily split or fracture to allow easy release of the adhesive layer from an adjacent barrier composite.

A print may be configured on the barrier composite that is thermochromic or has thermochromism properties, a reversible change of color with a change of temperature. The print may indicate when the barrier composite can be applied to a building. The adhesive may function only when the temperature is above a threshold temperature and therefore, the print indicated if the barrier composite can be applied. If the temperature is too low, the thermochromic print may appear and state, "TOO COLD FOR INSTALLATION". Likewise, tape is typically applied along the seams of the barrier composite to prevent water ingress and the thermochromic print may indicate when the temperature is too low for the tape to be applied. A thermochromic ink may include liquid crystals and leuco dyes.

Likewise, there are hydrochromic inks that change color when activated by water. A print may be configured on the barrier composite that provides notice of the hydrated condition of the barrier composite. The print may state that the barrier composite is not acceptable for application as it is wet or moist. The moisture may prevent proper adhesion of the barrier composite to the building and/or tape over the seams of the barrier composite. A hydrochromic ink or print may be more essential for roofing underlayment, as this material may be slippery when wet.

Definitions:

Shingles as used herein refers to the outer covering of a building or structure and may include shingles, siding and the like.

An integral release material that enables an adhesive, such as a pressure sensitive adhesive to peel away therefrom, whereby the integral release material fractures and sticks to the adhesive, for example.

An integral release layer includes portions of the surface area that are configured to fracture and stick to the adhesive when it is peeled away from or separated from the exterior surface of a barrier composite.

A barrier composite with stand-offs to promote drainage down along the barrier composite when applied to an exterior wall surface is referred herein as a drainage barrier composite, both of which are sheets or rolls of material that are flexible and capable of being spooled into roll.

The summary of the invention is provided as a general introduction to some of the embodiments of the invention, and is not intended to be limiting. Additional example embodiments including variations and alternative configurations of the invention are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

FIG. 12 shows a flow chart of a process to form a barrier composite having stand-offs coupled to a barrier layer.

FIG. 15 shows a flow chart of a process to form a barrier composite having stand-offs coupled to a barrier layer.

Figure 1:
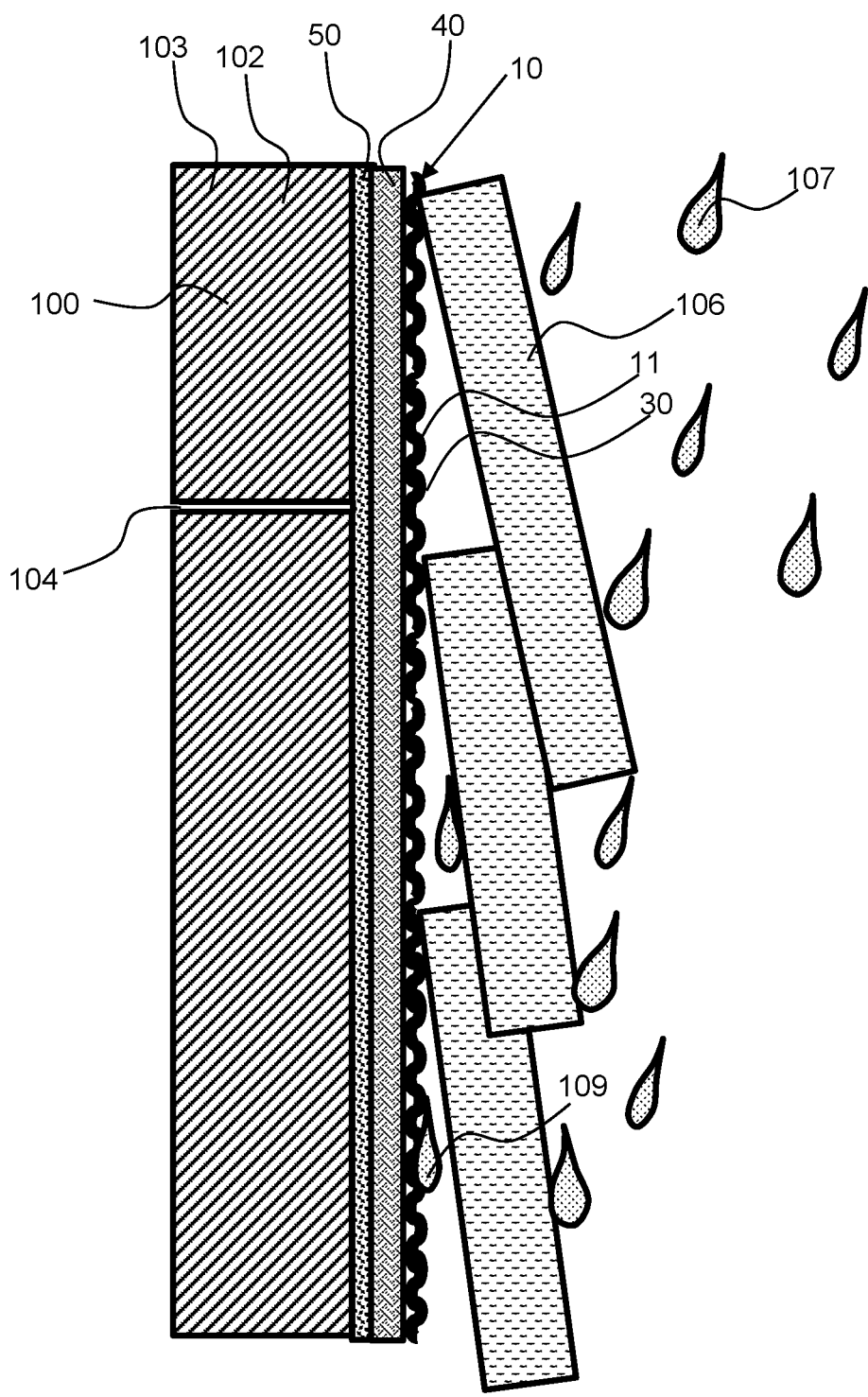
FIG. 1 shows a side cross sectional view of a building having a barrier composite coupled to an exterior wall surface and shingles coupled to the exterior wall surface.

Corresponding reference characters indicate corresponding parts throughout the several views of the figures. The figures represent an illustration of some of the embodiments of the present invention and are not to be construed as limiting the scope of the invention in any manner. Some of the figures may not show all of the features and components of the invention for ease of illustration, but it is to be understood that where possible, features and components from one figure may be included in the other figures. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

As shown in FIG. 1, a building 100 has a drainage barrier composite 11, a type of barrier composite 10 as described herein, coupled to an exterior wall surface 102 and shingles 106 coupled to the exterior wall surface through the barrier composite. The barrier composite has an adhesive 50 that adheres the barrier composite to the exterior wall surface, a barrier layer 40 to prevent precipitation from passing therethrough and a plurality of stand-offs 30 that enables the penetrated precipitation to drain down and along the barrier composite.

Figure 2:
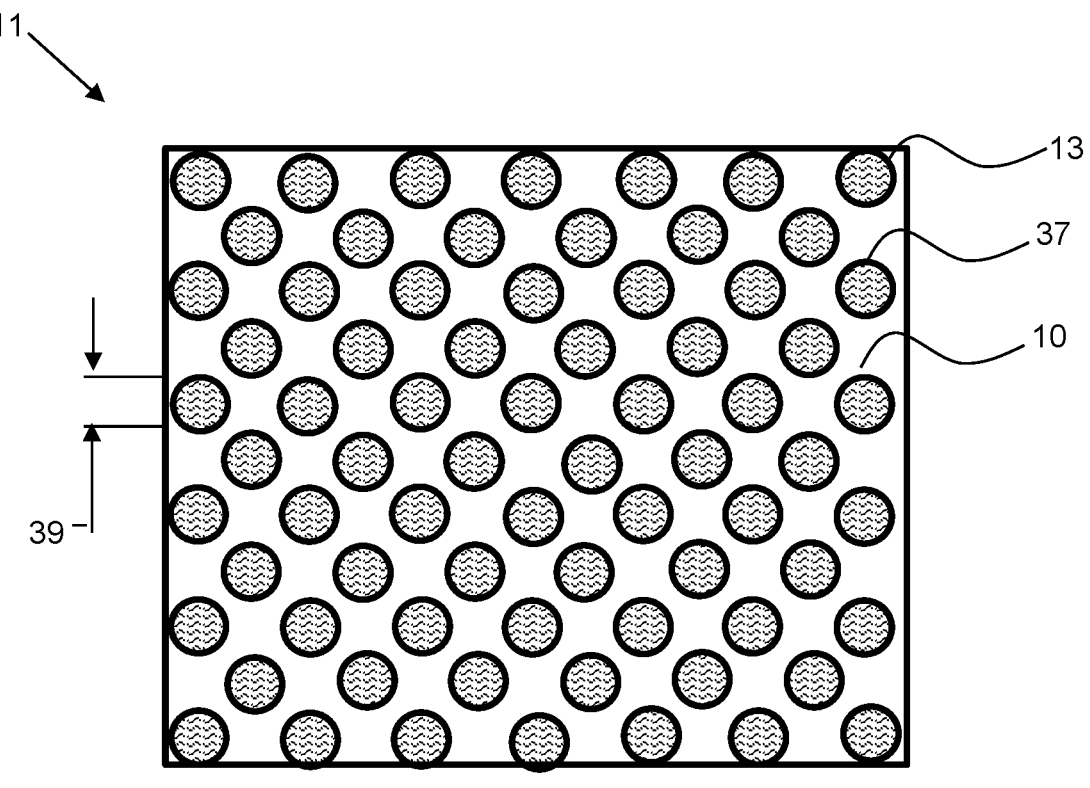
FIG. 2 shows an exterior surface view of an exemplary barrier composite having discrete circular stand-offs.

FIG. 2 shows an exterior surface 13 of an exemplary drainage barrier composite 11 having discrete circular stand-offs 37. The discrete stand-offs are circular in shape having a diameter 39. The specific coverage area is about 35%.

Figure 3:
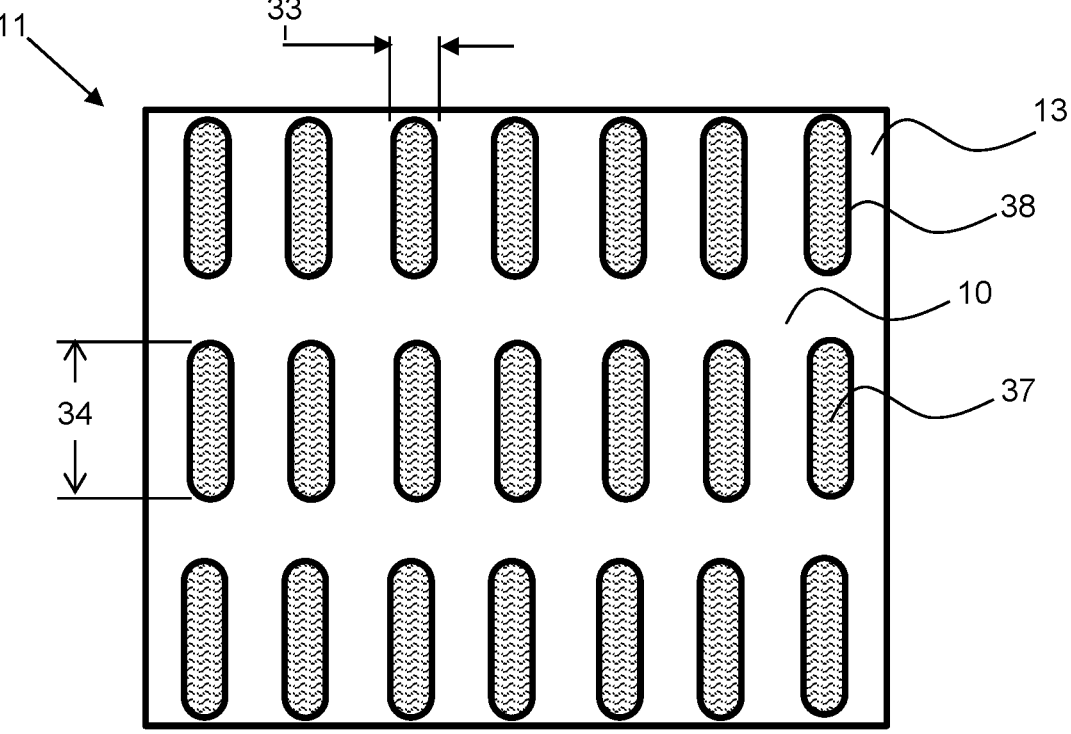
FIG. 3 shows an exterior surface view of an exemplary barrier composite having elongated stand-offs.

FIG. 3 shows an exterior surface 13 of an exemplary barrier composite 10 having elongated stand-offs 38 with a length 34 that is more than double the width 33.

Figure 4:
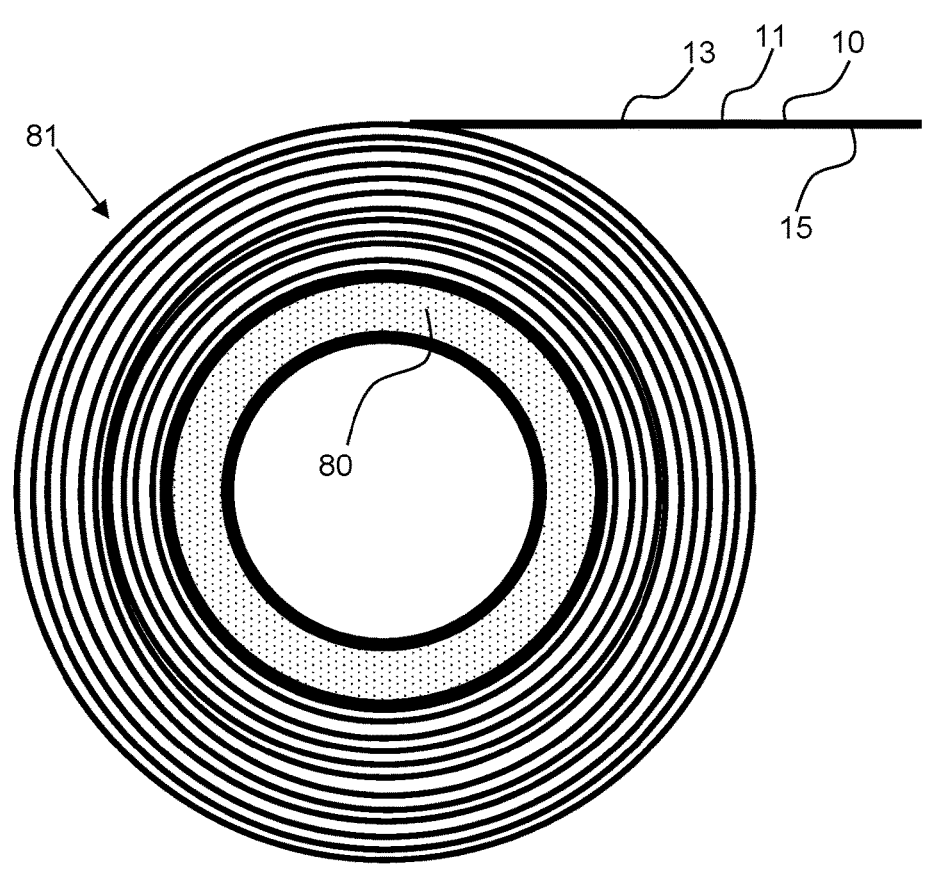
FIG. 4 shows a side view of a roll of barrier composite.
Figure 5:
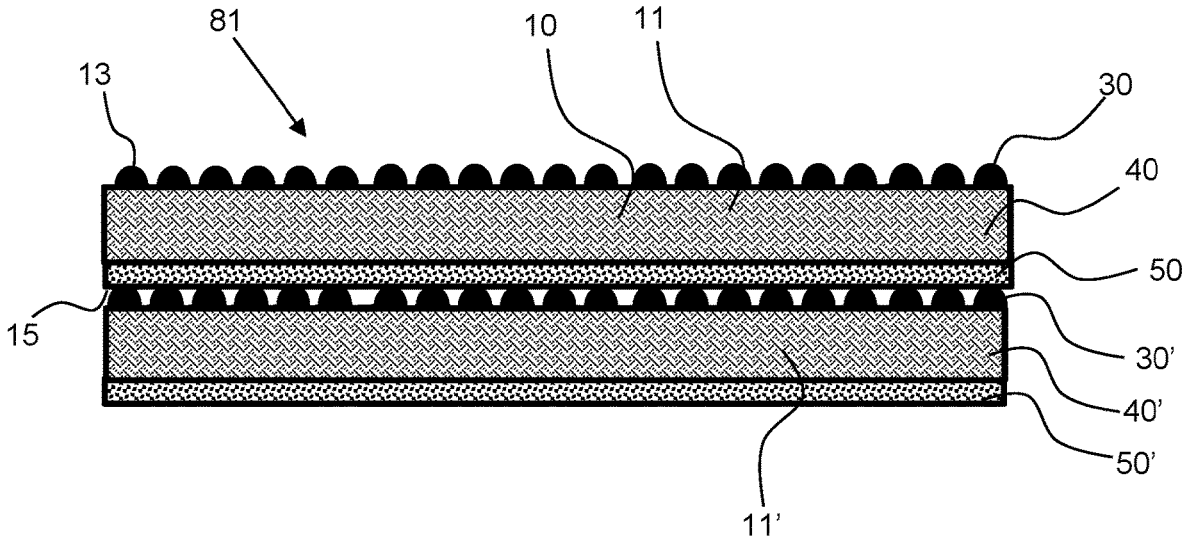
FIG. 5 shows an enlarged cross-sectional view of layers of the roll of barrier composite with an adhesive layer on the interior surface of a first layer of barrier composite contacting the stand-offs of a second layer of barrier composite.
Figure 6:
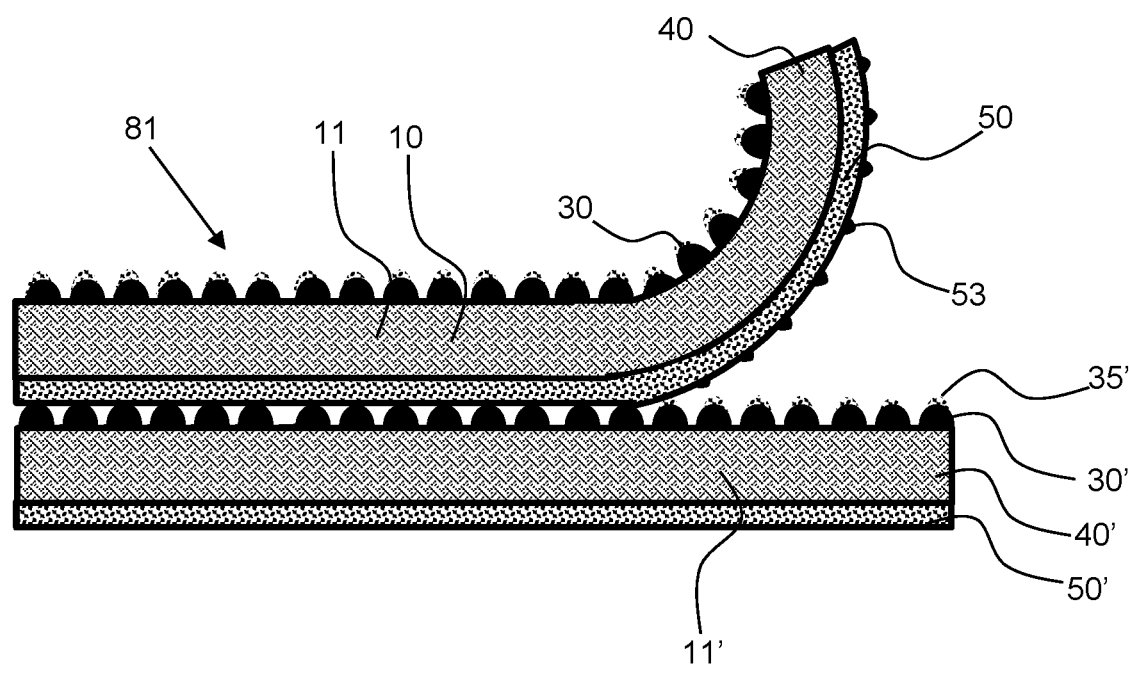
FIG. 6 shows a cross-sectional view of the layers of barrier composite shown in FIG. 5, with the first layer of barrier composite being unrolled from the second layer of barrier composite.
Figure 7:
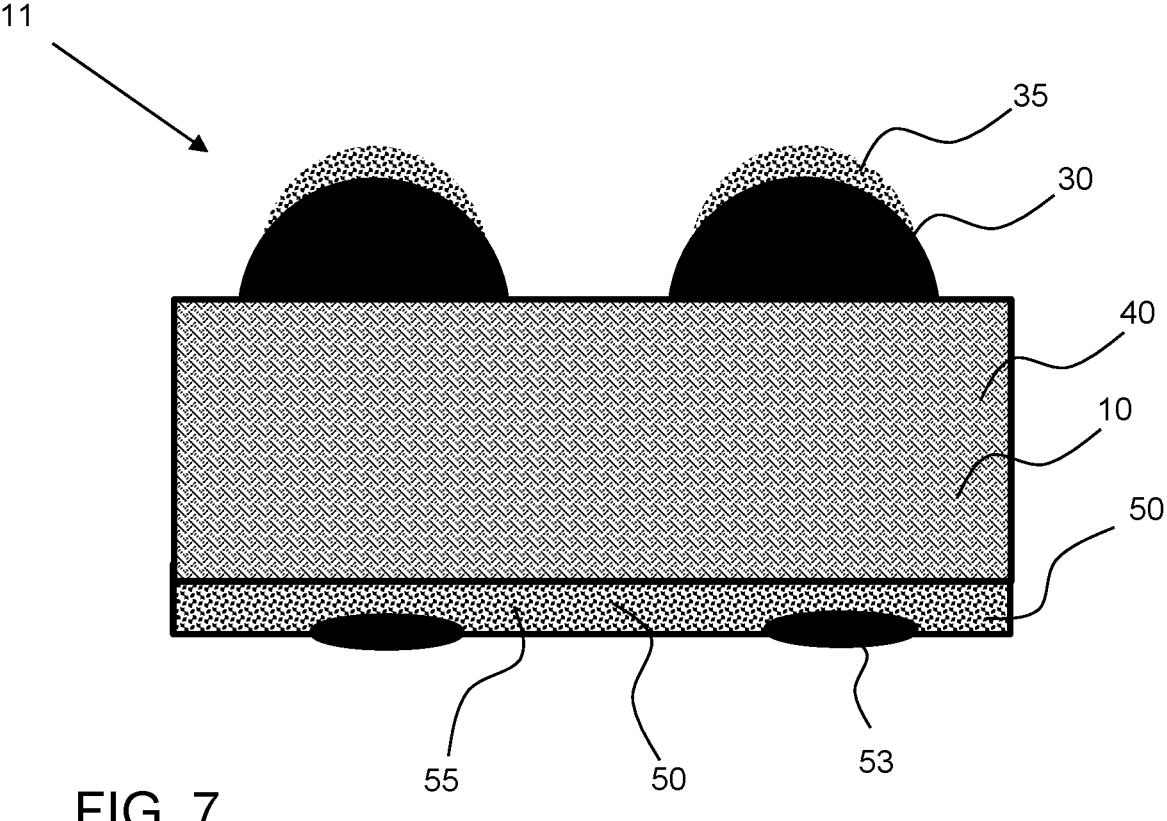
FIG. 7 shows an enlarged view of barrier composite with adhesive deposits configured on the stand-offs and stand-off deposits configured on the adhesive after being unspooled from a roll of barrier composite.

Referring now to FIGS. 4 to 7, an exemplary drainage barrier composite 11 may be configured with an adhesive on the interior surface 15 that is released by the stand-offs 30 on the exterior surface 13, when unrolled from the roll of barrier composite 81 shown in FIG. 4. The roll of barrier composite 81 has a plurality of layers of drainage barrier composite 11, 11' with the exterior surface 13 against the interior surface 15. As shown in FIG. 5, two adjacent layers of drainage barrier composite 11, 11' each have stand-offs 30, 30', a barrier layer 40, 40' and an adhesive layer 50, 50'. The stand-offs 30' of the second layer of drainage barrier composite 11' are in contact with the adhesive 50 of the first layer of drainage barrier composite 11. The stand-offs 30' prevent the adhesive 50 from the first layer of drainage barrier composite 11 from contacting the barrier layer 40' of the second layer of drainage barrier composite 11. As shown in FIGS. 6 and 7, when the first layer of drainage barrier composite 11 is unspooled from the roll of barrier composite 81 and peeled off from the second layer of drainage barrier composite 11', adhesive deposit 35' may be left on the stand-offs 30' from the adhesive layer of the adjacent layer of barrier composite and/or stand-off deposits 53 may be configured on the adhesive 50 from the unspooled layer of drainage barrier composite 11'. The stand-offs may effectively prevent permanent adhesion of the adhesive layer to the adjacent layer of barrier composite and may be configured to fracture to leave a stand-off deposit and/or the adhesive may be configured to fracture and leave an adhesive deposit on the stand-off. The adhesive may be configured with an exposed adhesive area 55, area without the stand-off deposits and this area may be effectively large enough to enable the barrier composite 11 to be adhered to an exterior wall surface and may be at least 25% or more and more preferably at least 50% or more or even 75% or more. The more exposed adhesive area, the better the adhesion to the exterior wall surface.

Figure 8:
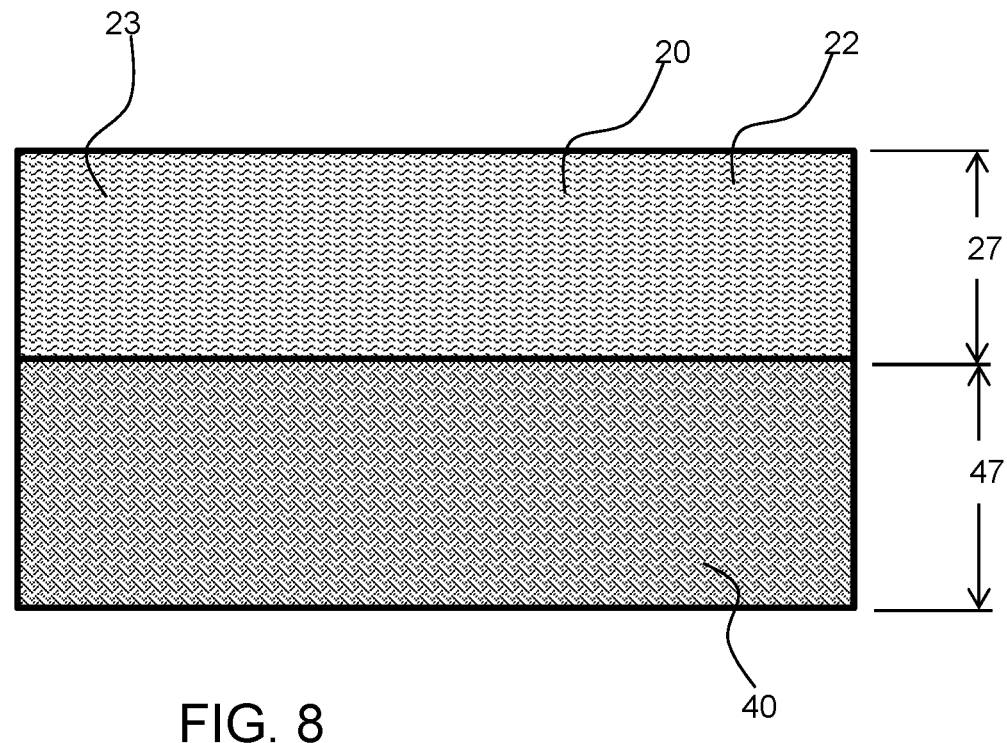
FIG. 8 shows a side cross-sectional view of a barrier layer and a stand-off precursor layer coupled together.

Referring now to FIGS. 8 to 12, an exemplary drainage barrier composite 11 may be made by attaching a barrier layer to a stand-off precursor layer 20, as shown in FIG. 8. The standoff precursor layer 20 has a thickness 27 and the barrier layer 40 has a thickness 47. The stand-off precursor layer may include a stand-off fabric 23 that may be a woven, non-woven fabric or foam and have pores 22 and be low density. A stand-off fabric may have a plurality of layers and these layers may not be the same polymer or composition. A first layer may have a higher melt temperature than a second layer, for example. Also, a foam and woven or non-woven may be used in combination as a stand-off precursor fabric or stand-off precursor layer.

Figure 9:
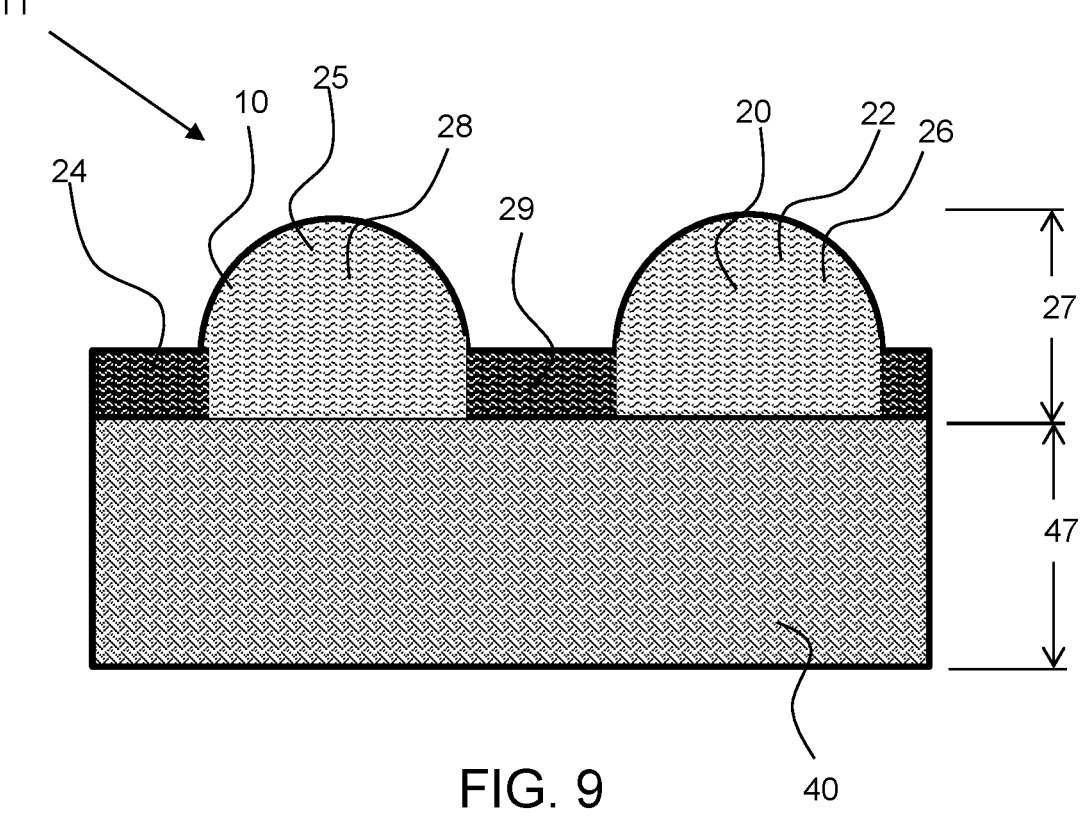
FIG. 9 shows the barrier layer and a stand-off precursor layer shown in FIG. 8 after the stand-off precursor layer has been compressed to form compressed portions and stand-offs or stand-off precursors.
Figure 10:
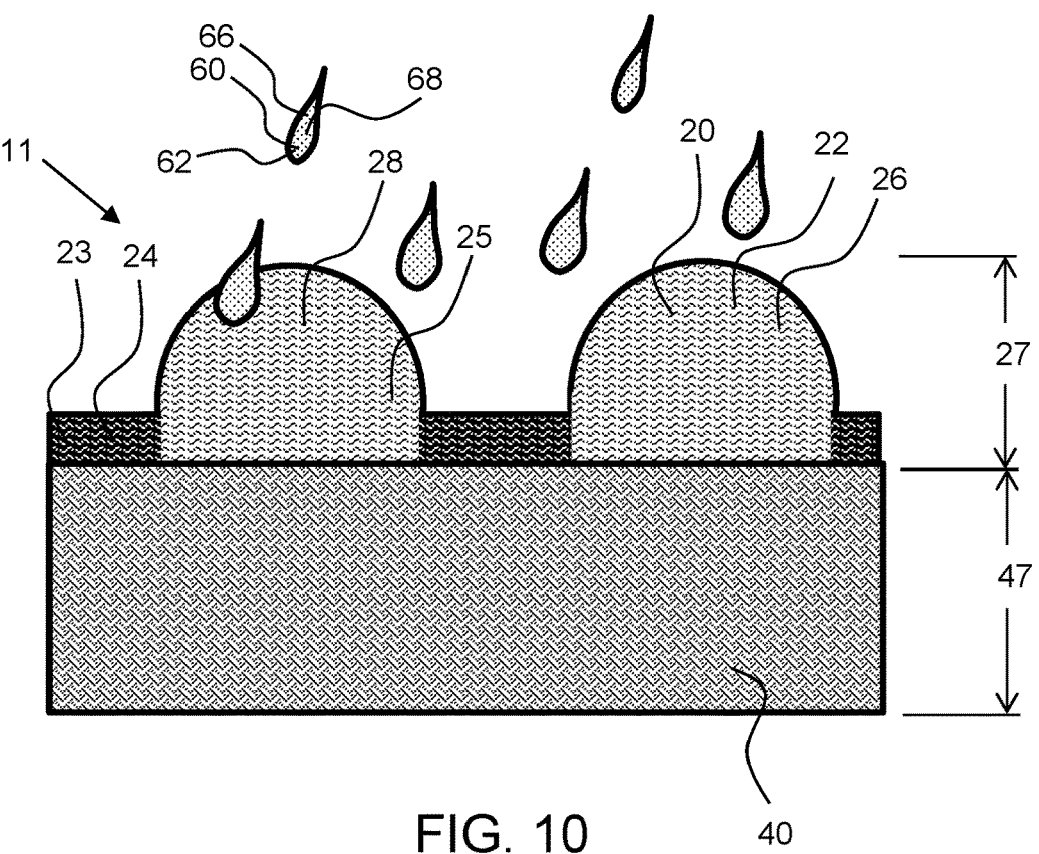
FIG. 10 shows a cross sectional view of the barrier layer and a stand-off precursor layer shown in FIG. 9, with impregnation liquid being added to the stand-off precursor layer and being absorbed into the low-density stand-offs.
Figure 11:
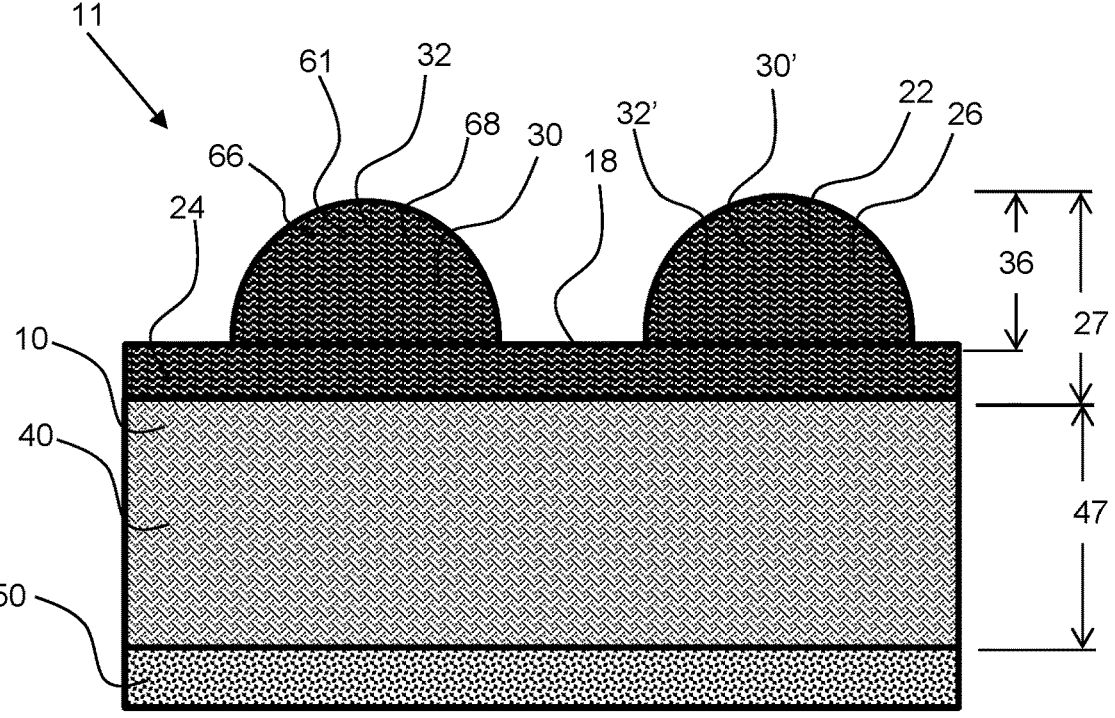
FIG. 11 shows a cross sectional view of the barrier layer and a stand-off precursor layer shown in FIG. 10, with the impregnation liquid being cured to form stand-offs with a higher density than the low-density stand-offs.

As shown in FIG. 9, the stand-off precursor layer 28 has been compressed in areas to form compressed portions 24 and non-compressed portions 26, or low-density stand-offs 25. The compressed portions may also be heated to form melted compressed portions 29. The stand-off fabric may be a continuous fabric extending continuously across the exterior surface of the barrier composite with discrete stand-offs formed therein. A patterned compression roll may be used to form the stand-off precursors 28 shown in FIG. 9. An impregnation fluid 60 may then be applied to the stand-off precursor layer 20 and absorbed into the low-density stand-offs 25 as shown in FIG. 10. The impregnation fluid 60 may include a carrier liquid 62, an impregnation solid material 66 and may also include a release material 68, a material that will aid in preventing the stand-off from sticking to the adhesive 50 and will enable release of the stand-off from the adhesive. The impregnation fluid 60 may then be cured to form composite stand-offs 32, 32' including the stand-off precursor 28 and the cured impregnation fluid 61. During curing, the carrier liquid 62 may be heated to evaporate out the carrier liquid and leave the impregnation solid material 66 in the stand-offs. Also, the impregnation solid material 66 may be cross-linked by heating, ultraviolet light (UV) light exposure or by application of a cross-linker. The composite stand-off 32 has a height 36 that may be effectively large enough to enable drainage of water between the stand-offs. The composite stand-off 32 may have a density that is effectively high to prevent compression in use and to maintain drainage channels 18 between the stand-offs 30, 30' as shown in FIG. 11. Note that the process of impregnation and curing may be repeated a number of times to increase the density of the stand-offs from the density of the stand-off precursor to an effectively high density, such as two or more times, three or more times or even five or more times over the density of the stand-off precursor. The impregnation solid material 66 may include a release material 68 that is configured to allow the adhesive to release therefrom and may include a low surface tension material or polymer, such as a fluoropolymer, or silicone and the like.

FIG. 12 shows a flow chart of a process to form a barrier composite having stand-offs coupled to a barrier layer.

Figure 13:
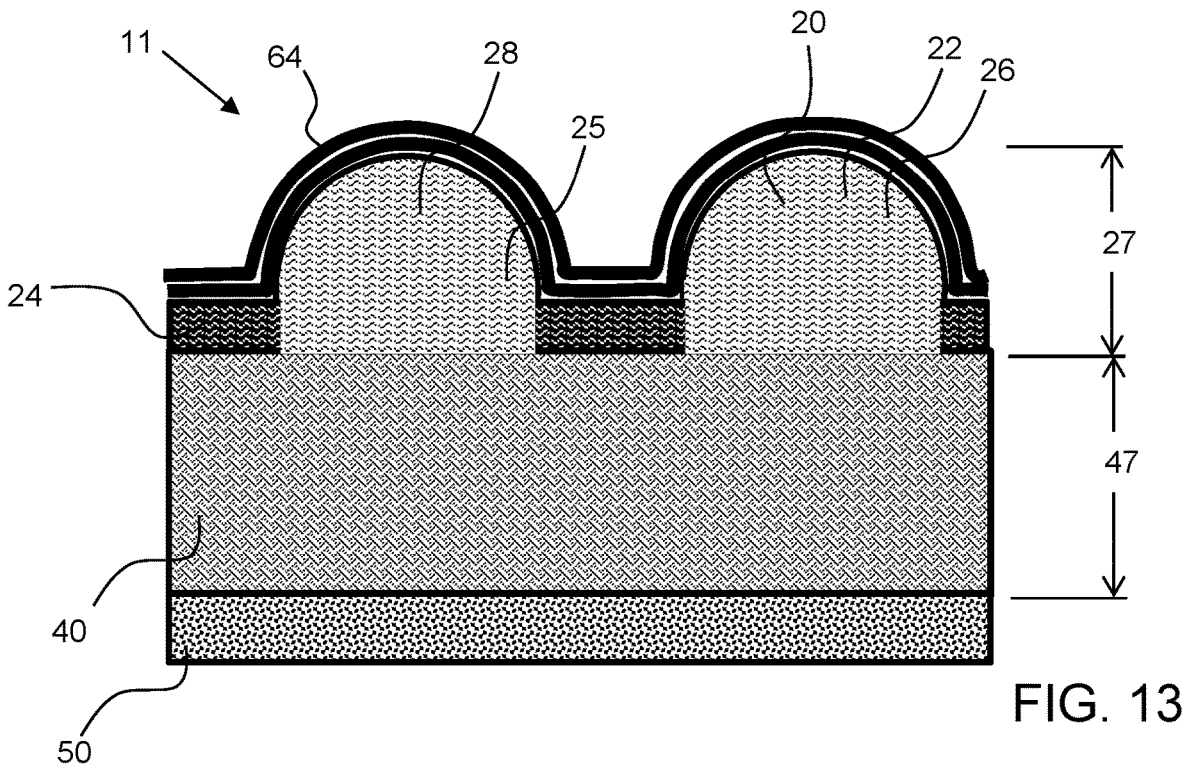
FIG. 13 shows a cross sectional view of the barrier layer and a stand-off precursor layer shown in FIG. 9, with impregnation layer configured over the stand-off precursor layer.
Figure 14:
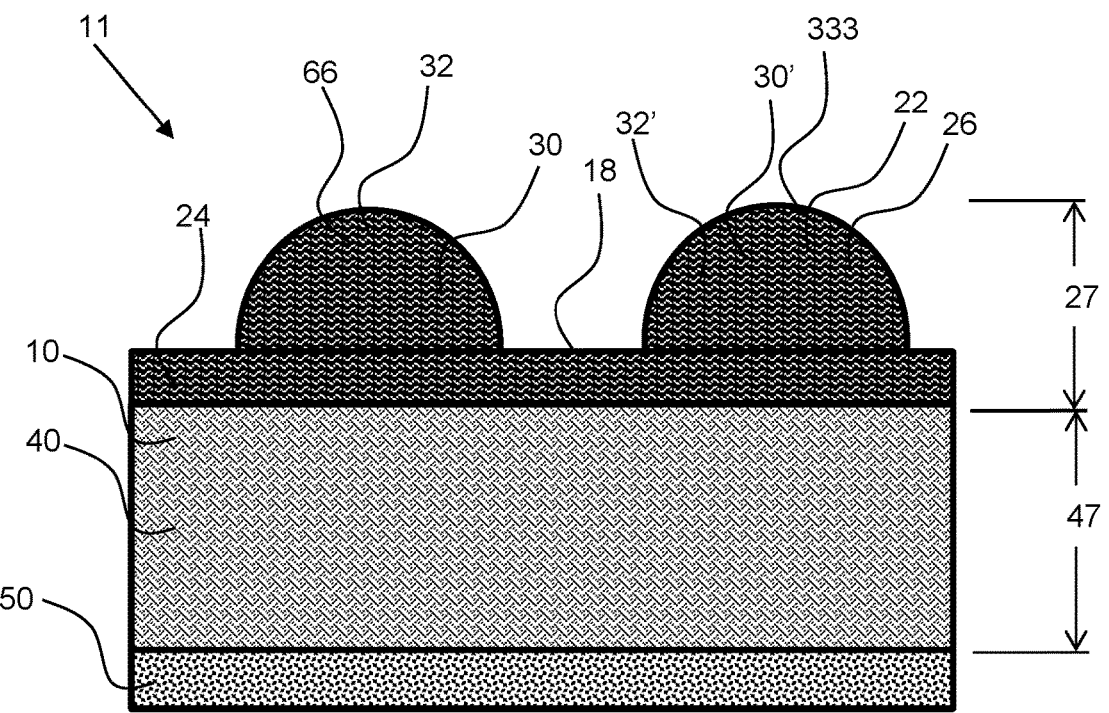
FIG. 14 shows a cross sectional view of the barrier layer and the stand-off precursor layer shown in FIG. 13, with the impregnation layer being melted into the stand-offs to form stand-offs with a higher density than the low-density stand-offs.

Referring now to FIGS. 13 to 15, a drainage barrier composite 11 may be formed by applying an impregnation layer 64 over the stand-off precursor layer 20 and then melting the impregnation layer, whereby the melted impregnation layer wicks into or absorbs into the stand-off precursor 28 to form composite stand-offs 32, 32'. As shown in FIG. 13, the impregnation layer, such as a film of polymer is applied over the precursor layer and may be adhered to the stand-off precursor, such as by being melt laminated, for example. The impregnation layer may have a lower melt temperature than the stand-off precursor and heating to a temperature above the melt temperature of the impregnation layer may cause the impregnation layer to melt and wick into the pores 22 of the stand-off precursor layer 20 to produce a composite stand-off 32 having a higher density than the stand-off precursor 28 of the stand-off precursor layer, as shown in FIGS. 13 and 14. The impregnation layer 64 may be configured on the extended end 333 of the stand-offs 30, 30' and may produce an integral release layer 70, that aids in the release of the stand-off from the adhesive 50. FIG. 15 shows a flow chart of a process to form a barrier composite having composite stand-offs formed by the melting of the impregnation layer therein.

Figures 16, 17:
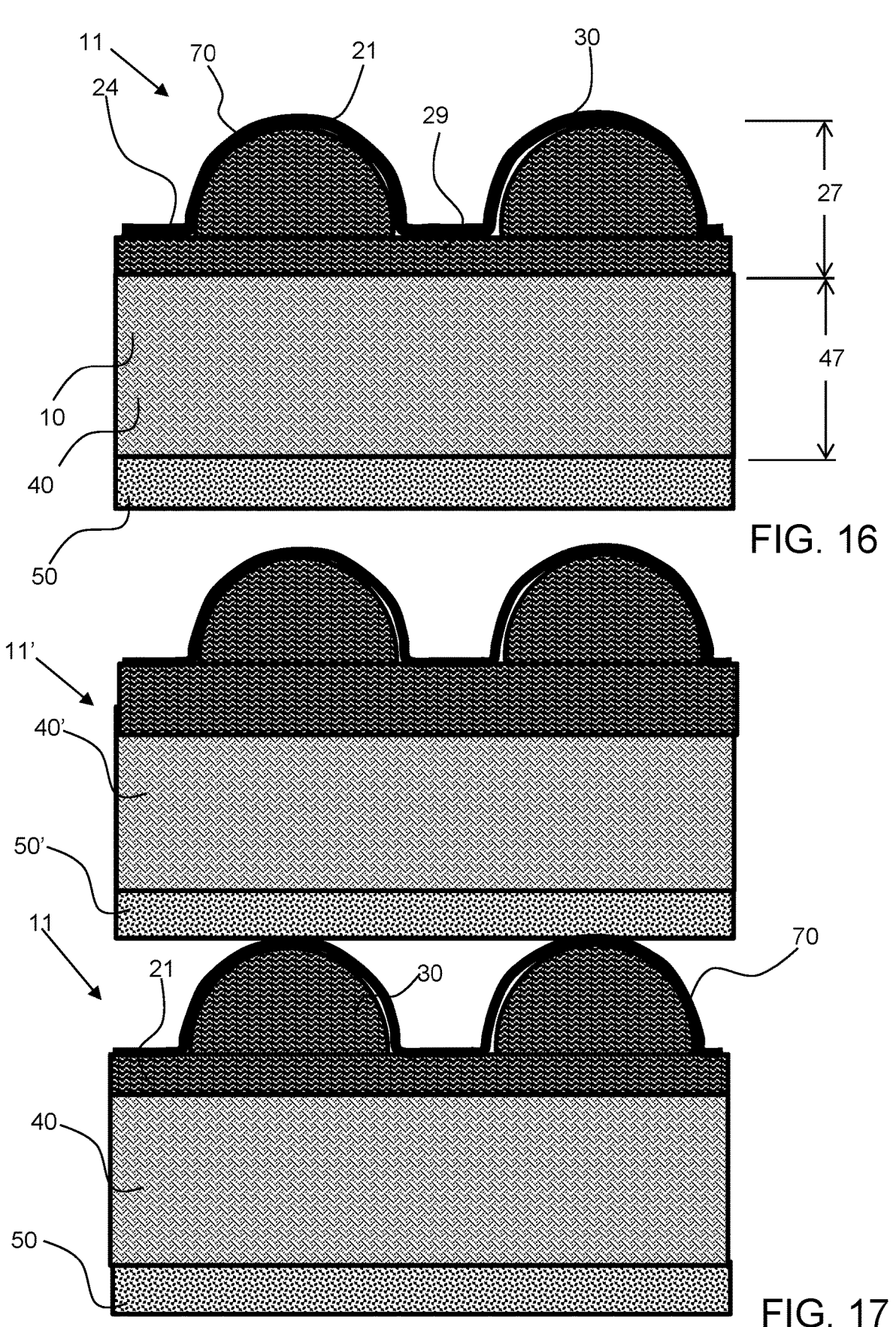
FIG. 16 shows a cross sectional view of the barrier layer and a stand-off layer with an integral release layer configured over the stand-off precursor layer.
FIG. 17 shows an enlarged cross-sectional view of layers of barrier composite with an adhesive layer on the interior surface of a first layer of barrier composite contacting the integral release layer of the second layer of barrier composite.
Figure 18:
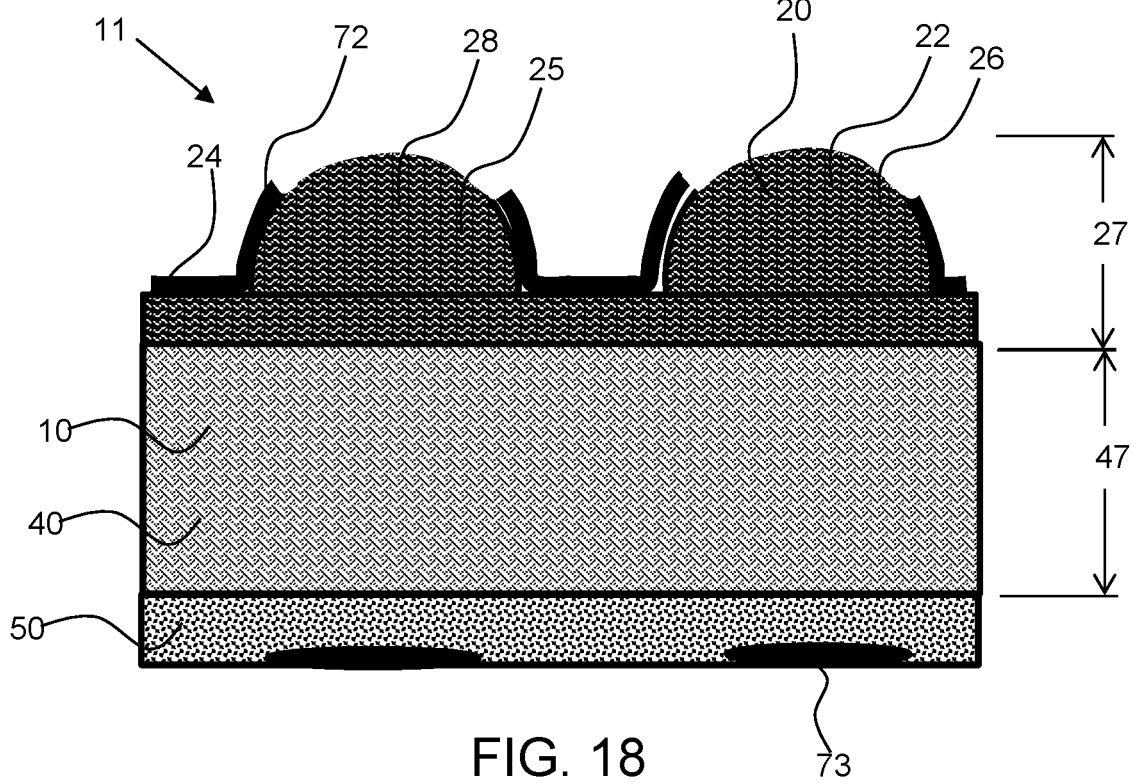
FIG. 18 shows a cross-sectional view of the layers of barrier composite shown in FIG. 17, with release layer deposits configured on the adhesive after being unspooled from a roll of barrier composite, wherein the integral release layer is now a fractured release layer.

Referring now to FIGS. 16 to 18, a drainage barrier composite 11 may be formed by applying an integral release layer 70 over the stand-off layer 21 or stand-offs 30. The integral release layer may be bonded to the stand-off layer 21 by melt lamination or with an adhesive. The integral release layer, stand-off precursor and the barrier layer may all be attached together in a single step such as by passing the material through a patterned calendaring roll to produce the compressed portions 24 and if heat is applied melted compressed portions 29. As shown in FIG. 17, the integral release layer is configured between stacked or rolled layers of the barrier composite 10, 10' and prevents the adhesive 50' from a second layer of barrier composite 10' from sticking to and adhering to the stand-offs 30 of the first layer of barrier composite 10. As shown in FIG. 18, the integral release layer may be configured to split or fracture when the layers of drainage barrier composite 11, 11' are separated, such as by being unspooled from a roll of barrier composite. The integral release layer 70 is now a fractured release layer 72 and release layer deposits 73 may be stuck to the adhesive layer, as shown in FIG. 18.

Figure 19:
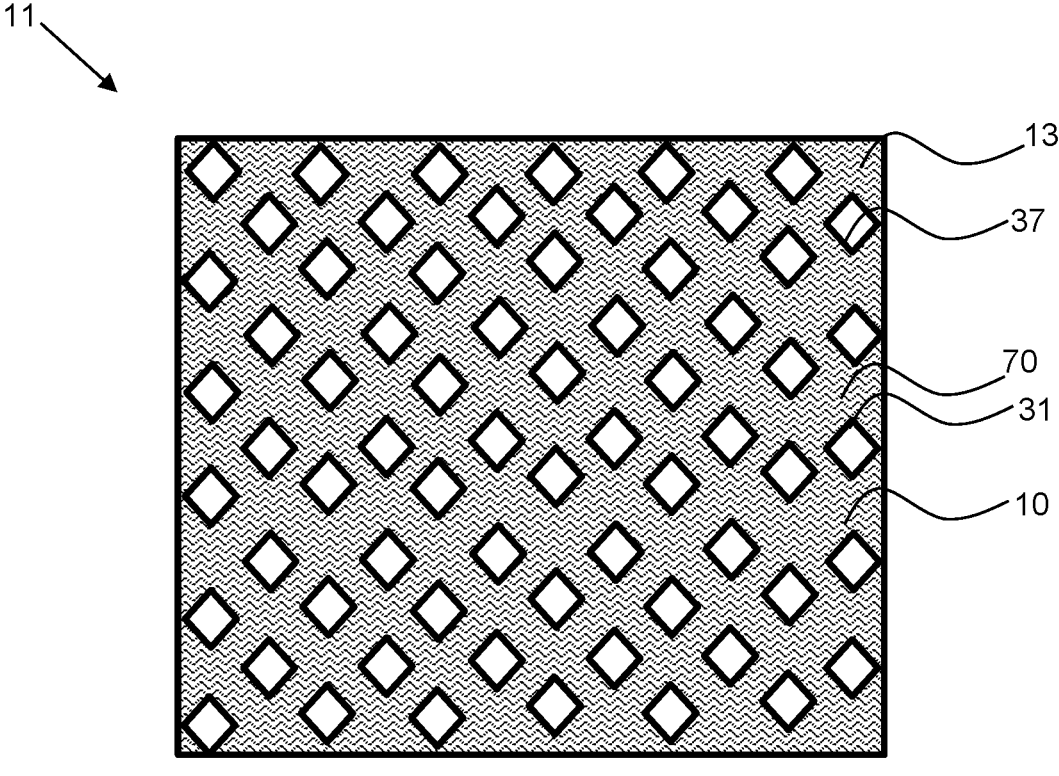
FIG. 19 shows an exterior surface view of an exemplary barrier composite having discrete polygonal stand-offs.

FIG. 19 shows an exterior surface 13 of an exemplary drainage barrier composite 11 having discrete polygonal shaped stand-offs 37. The discrete stand-offs are diamond shaped having corners 31 that may be conducive to initiating a tear of an integral release layer 70. When the adhesive is pulled from the surface, the integral release layer may tear starting at the corner of the polygonal stand-offs. The specific coverage area is about 35%.

Figure 20:
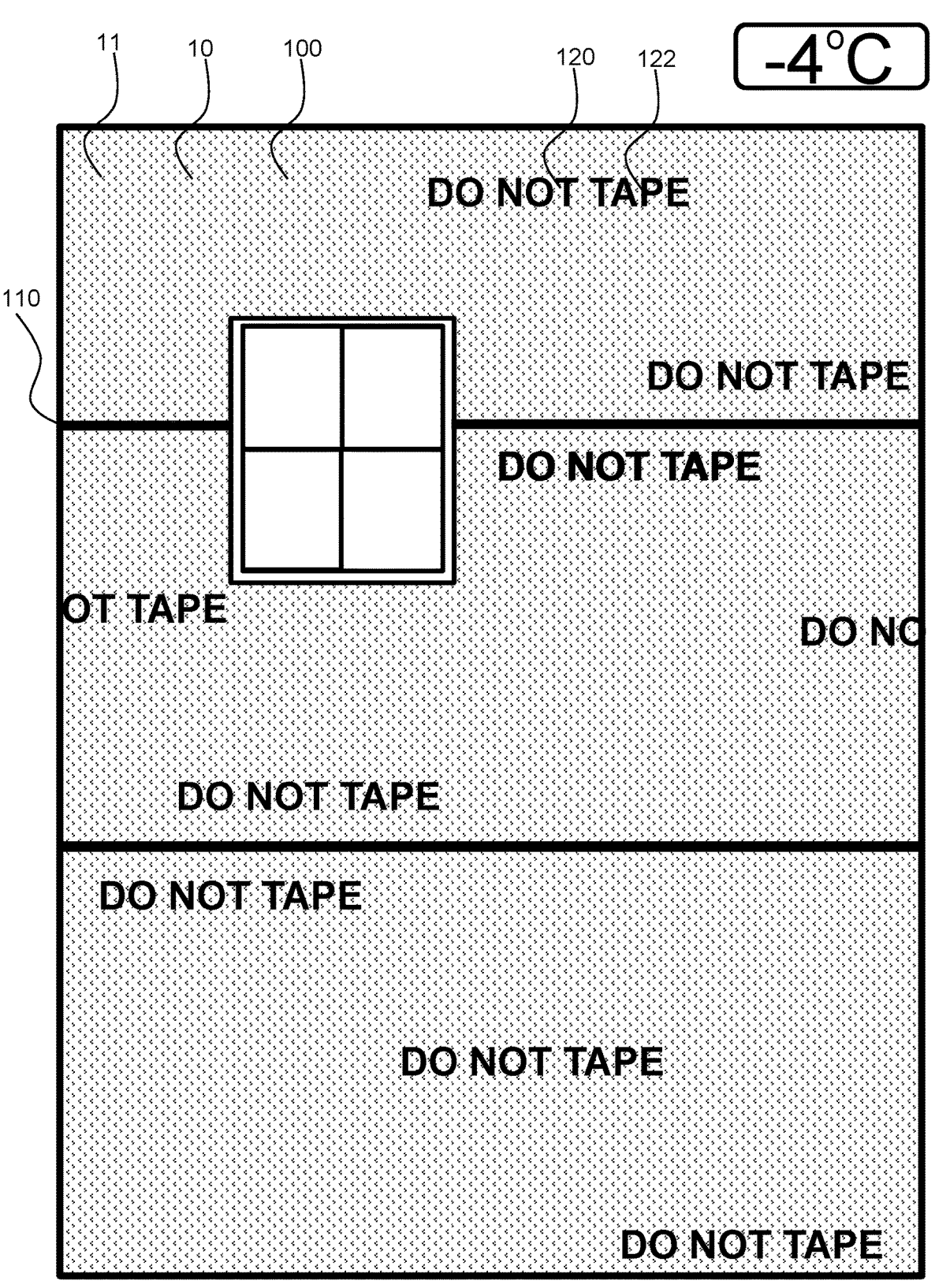
FIG. 20 shows an outside view of a building having barrier composite configured thereon and a thermochromic print that is visible when the temperature is below a recommended temperature for the application of tape to the seams between barrier composite sections.

FIG. 20 shows an outside view of a building 100 having barrier composite 10 configured thereon and a thermochromic ink 120 forming a thermochromic message 122 that is visible when the temperature is below a recommended temperature for the application of tape to the seams 110 between barrier composite sections.

Figure 21:
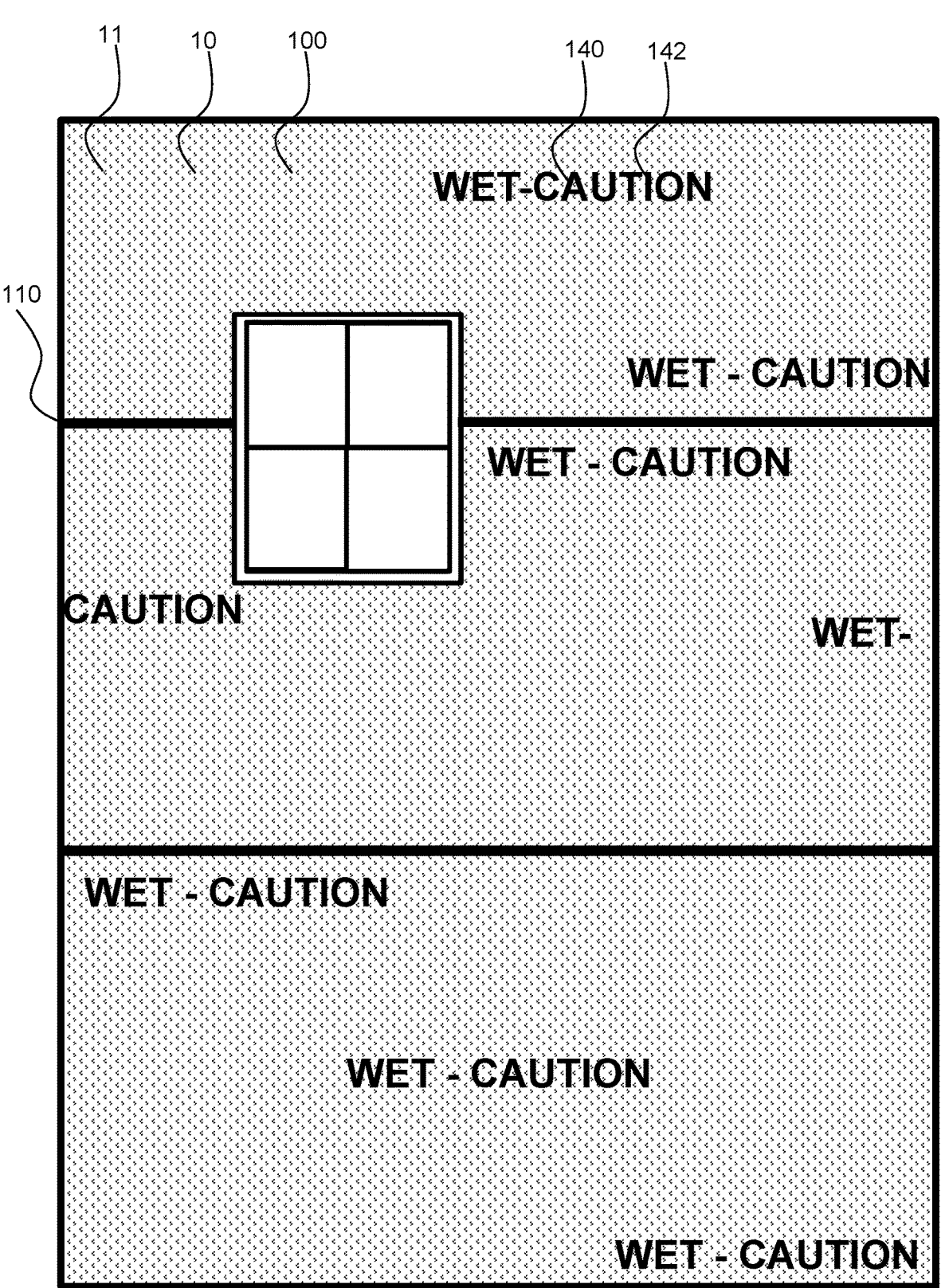
FIG. 21 shows an outside view of a building having barrier composite configured thereon and a hydrochromic print that is visible when the barrier composite is moist or wet.

FIG. 21 shows an outside view of a building 100 having barrier composite 10 configured thereon and a hydrochromic ink 140 forming a hydrochromic message 142 that is visible when the barrier composite 10 is moist or wet and not suitable for the application of tape to the seams 110 between barrier composite sections. A hydrochromic ink may change color when activated by water. A print may be configured on the barrier composite that provides notice of the hydrated condition of the barrier composite. The print may state that the barrier composite is not acceptable for application as it is wet or moist. The moisture may prevent proper adhesion of the barrier composite to the building and/or tape over the seams of the barrier composite. A hydrochromic ink or print may be more essential for roofing underlayment, as this material may be slippery when wet.

Figure 22:
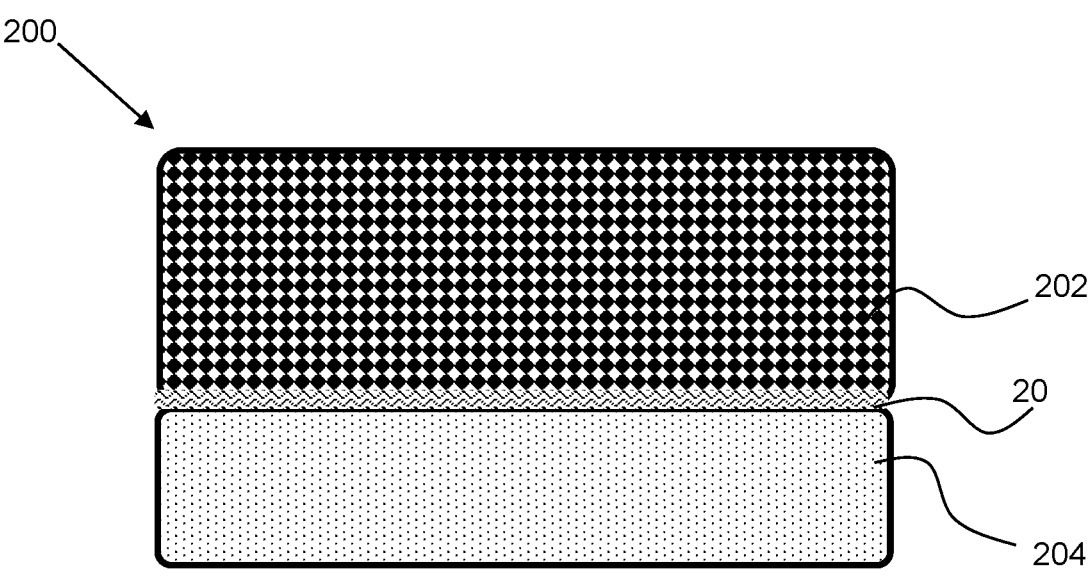
FIG. 22 shows a calendaring roll apparatus with a patterned calendaring roll pinched against a pressure roller that is heated.
Figure 23:
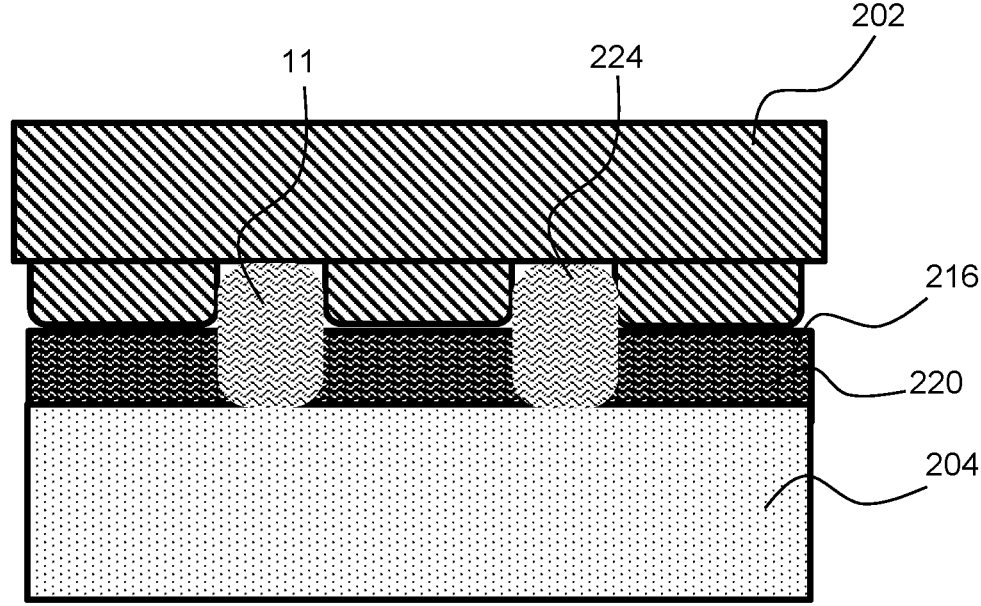
FIG. 23 shows cross-sectional view of a calendaring roll apparatus with a patterned calendaring roll pinched against a pressure roller to form a calendared stand-off layer.

With reference to FIGS. 22 and 23, a calendaring apparatus 200 includes a patterned calendaring roll 202 having raised portions for calendaring a stand-off precursor layer 212 to form a calendared stand-off layer 216 having compressed portions 220 and stand-off portions 224. As shown in FIG. 23, a pressure roller 204 and the patterned calendaring roll 202 are pressed against each other with the stan-off precursor layer 20 fed therebetween. The spaces between the raised portions of the patterned calendaring roll form the stand-offs or stand-off portions. The compressed portions may be heated and melt the stand-off material to form the compressed portions 220 and melt laminate the stand-off layer to the barrier layer or to melt laminate an integral release film to the stand-off layer. Note that the stand-off portions 224 may be compressed to some degree, but are less compressed than the compressed portions 220.

Figures 24, 25:
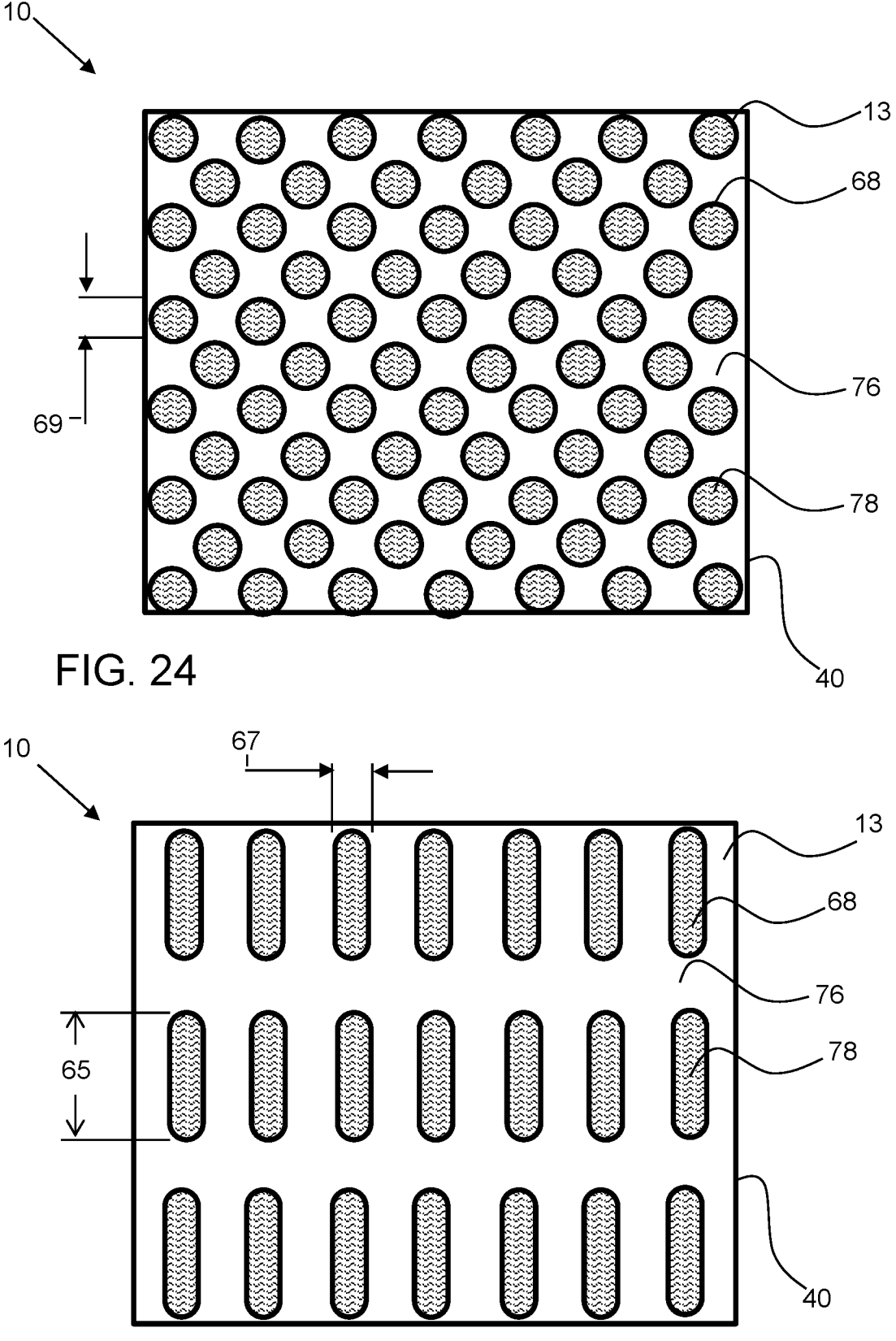
FIG. 24 shows an integral release layer attached to a barrier layer and having bonded portions and non-bonded portions, wherein the non-bonded portions are discrete and circular in shape.
FIG. 25 shows an integral release layer attached to a barrier layer and having bonded portions and non-bonded portions, wherein the non-bonded portions are discrete elongated non-bonded portions.

As shown in FIGS. 24 and 25, an exemplary barrier composite 10 includes an integral release material 68 that is attached to the barrier layer 40 on the exterior surface 13. The integral release material may be an integral release layer 70 that is includes bonded portions 76 and loose, or non-bonded portion 78, wherein the non-bonded portion may preferentially fracture and stick to an adhesive layer of an adjacent barrier composite 10 in a roll of barrier layer composite. The integral release layer 70 is a continuous layer that may be bonded by melt lamination or with an adhesive to the barrier layer 40. The loose or non-bonded portions may be discrete non-bonded portions 78 as shown, which may be preferred to enable the adhesive layer to fracture the non-bonded portions. The discrete non-bonded portions 78 are circular shaped and have a diameter 69 that may be about 2 mm or more, 4 mm or more, about 6 mm or more, about 8 mm or more, about 10 mm or more, about 15 mm or more, 20 mm or more, about 25 mm or more and any range between and including the dimensions provided. Note that the bonded portions are contiguous and extend between the non-bonded portions. As shown in FIG. 25, the integral release layer 70 may include elongated non-bonded portions 78 with a length 65 and width 67, wherein the length is at least two times greater than the width.

Figure 26:
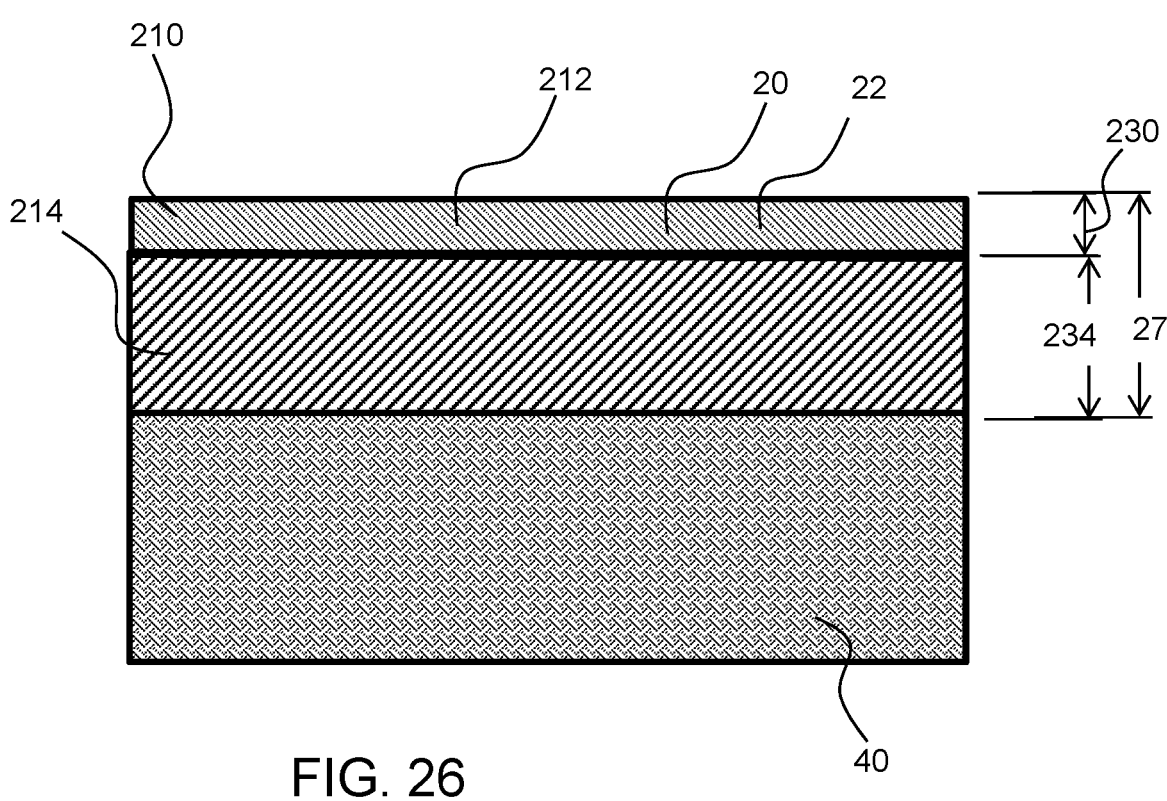
FIG. 26 shows a cross-sectional view of a multilayer stand-off precursor layer.
Figure 27:
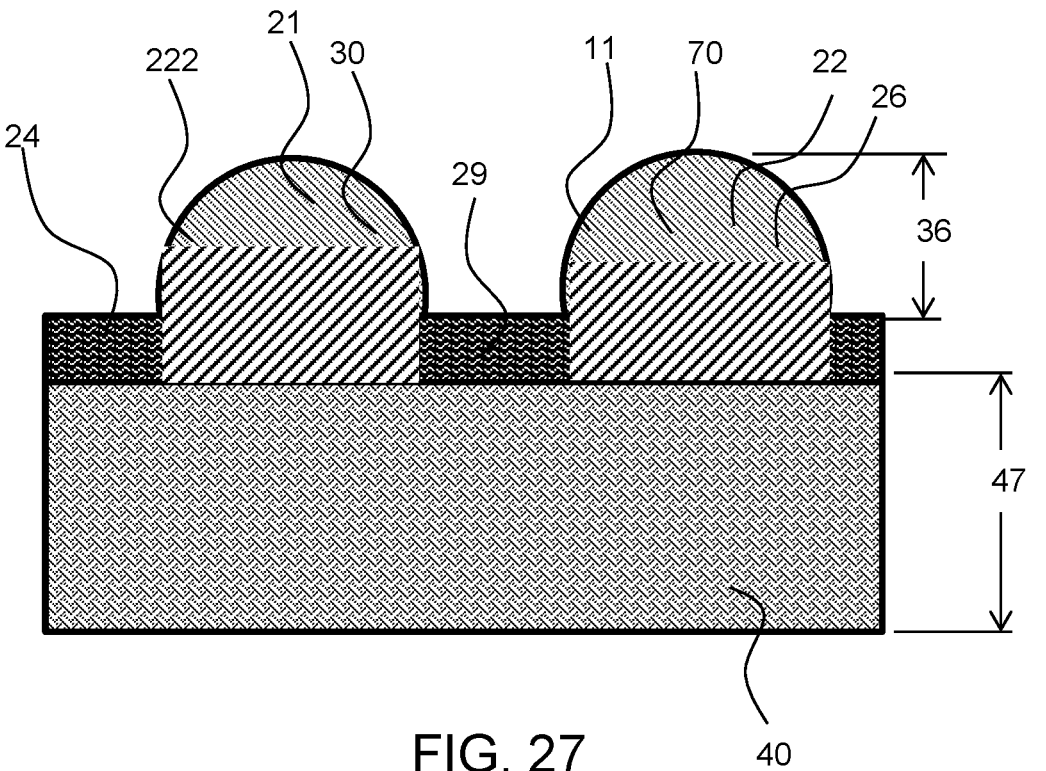
FIG. 27 shows a cross-sectional view of the multilayer stand-off precursor layer shown in FIG. 26 after processing to form compressed portions and stand-offs with an integral release layer on the extended ends of the stand-offs.

Referring now to FIGS. 26 and 27, an exemplary stand-off precursor layer 20 is a multilayer stand-off precursor layer 210, having a plurality of layers. In an exemplary embodiment an integral release layer 70 is an exterior stand-off layer 212 of a multilayer stand-off layer 21. The exterior stand-off layer 212 may be a material that configured to easily fracture and stick to an adhesive layer. An exemplary multilayer stand-off precursor layer 210 may comprise a fabric, such as a non-woven fabric and the exterior stand-off layer 212 may include smaller diameter and/or shorter fibers than a barrier stand-off layer 214. Smaller diameter fibers and shorter fibers will more readily peel off or fracture and stick to an adhesive than larger and longer fibers. Longer fibers will be more entangled and harder to pull apart or away from the bulk and larger fibers will be harder to split or break. A fiber diameter and/or length of the exterior stand-off layer may be substantially less than a fiber diameter or length, respectively, of a barrier stand-off layer, such as about 25% less or more, about 50% less or more, about 75% less or more and any range between and including the values provided. Also, the thickness 230 of an exterior stand-off layer 212 may be substantially less than a thickness 234 of a barrier stand-off layer 214. The fabric or non-woven material used as the stand-off precursor layer has pores 22 and the stand-off precursor layer has a thickness 27.

As shown in FIG. 27, the multilayer stand-off precursor layer 210, shown in FIG. 26, has been compressed in areas to form stand-offs 30 having the exterior stand-off layer 212 configured on the extended ends of the multilayer stand-offs 222 and the barrier stand-off layer 214 coupled to the barrier layer. This stand-off layer 21 is continuous across the barrier layer. The compressed portion 24 are configured between the non-compressed portions 26 and may be melt laminated to the barrier layer 40 to form melted compressed portions 29. A configuration as shown in FIG. 22 may be used to form the stand-off layer 21. The stand-offs 30 formed by compression of the multilayer stand-off precursor layer 210 has an integral release layer 70, the exterior stand-off layer 212. The stand-off height 36 is the height from the compressed portion 24.

It will be apparent to those skilled in the art that various modifications, combinations and variations can be made in the present invention without departing from the scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A method of adhering a drainage barrier composite to a wall surface comprising:

a) providing a barrier layer composite roll comprising:

a barrier layer that is water resistant, wherein liquid water will not pass through the barrier composite for 5 minutes with a 25 mm water column;

an adhesive, wherein the adhesive is attached to an interior surface of the barrier layer;

an integral release material;

wherein the integral release material is configured on the barrier layer opposite said interior surface of the barrier layer to form bonded areas of the integral release material that are bonded to the barrier layer and non-bonded areas of the integral release material that are not bonded to the barrier layer;

wherein the barrier composite roll has a plurality or layers with an adhesive layer of a first layer of barrier composite adjacent the integral release material of a second layer of the barrier composite; and wherein the non-bonded areas of the integral release material of said second layer of the barrier composite are configured to fracture and stick to said adhesive layer of said first layer of barrier composite when the barrier composite roll is unspooled b) unrolling the draining barrier composite and during unrolling separating a portion of the integral release layer onto the adhesive layer; and c) pressing the adhesive layer of the barrier composite onto said exterior wall surface to adhere the barrier composite to said exterior surface.

2. The method of claim 1, wherein the integral release material is an integral release film.

3. The method of claim 2, wherein the integral release film is a polymeric film.

4. The method of claim 3, wherein the integral release material is a continuous polymeric over the barrier layer.

5. The method of claim 1, wherein the non-bonded areas form no more than 75% of a surface area of the integral release film.

6. The method of claim 1, wherein the non-bonded areas form no more than 50% of a surface area of the integral release film.

7. The method of claim 1, wherein the non-bonded areas form no more than 75% of a surface area of the integral release film and are discrete areas.

8. The method of claim 7, wherein the integral release film is a polymeric film.

9. The method of claim 1, wherein the adhesive is a pressure sensitive adhesive.

10. The method of claim 1, wherein the barrier layer further comprises stand-offs configured on an opposite side of the barrier layer from the adhesive layer;

wherein said stand-offs have a height of at least 0.2 mm; and wherein the integral release material extends over the stand-offs; and wherein the stand-offs provide water drainage when attached to said exterior wall surface.

11. The method of claim 10, wherein the bonded portions of the integral release film are configured between the stand-offs and wherein the integral release layer is not attached to an extended end of the stand-offs.

12. The method of claim 10, wherein the bonded portions of the integral release film are bonded by melt lamination.

13. The method of claim 12, wherein the stand-off layer is a continuous stand-off layer extending over the barrier layer.

14. The method of claim 13, wherein the continuous stand-off layer comprises compressed portions that form the stand-offs.

15. The method of claim 14, wherein the integral release film is melt bonded to the compressed portions of the continuous stand-off layer.

16. The method of claim 14, wherein the integral release film is attached to the compressed portions of the continuous stand-off layer by an adhesive.

17. The method of claim 10, wherein the stand-off precursor is a multilayer fabric having an exterior layer and a barrier-side layer attached to the barrier layer.

18. The method of claim 10, wherein the stand-offs have an area density at least 25%.

19. The method of claim 10, wherein the stand-offs are discrete stand-offs.

20. The method of claim 10, wherein the stand-offs are elongated stand-offs having a length that is at least twice a width.

* * * * *